June 27, 1939.　　　E. G. BIEDERMAN　　　2,163,863
APPARATUS FOR WELDING
Filed Sept. 15, 1937　　　21 Sheets-Sheet 1

INVENTOR.
Edward G. Biederman
Barnes, Kisselle, Laughlin & Raisch
ATTORNEYS

June 27, 1939.  E. G. BIEDERMAN  2,163,863
APPARATUS FOR WELDING
Filed Sept. 15, 1937   21 Sheets-Sheet 2
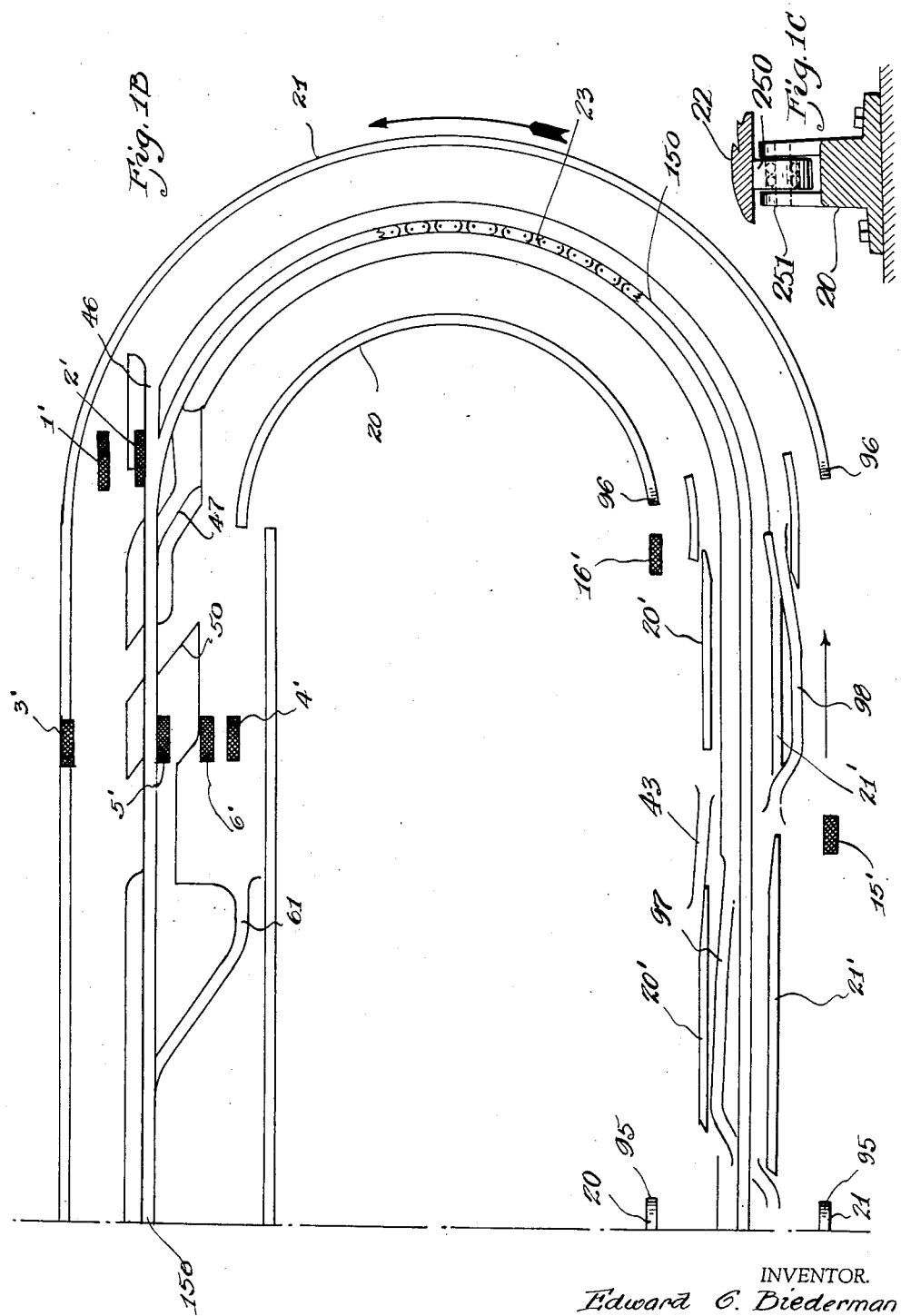
INVENTOR.
Edward G. Biederman
BY Barnes, Kisselle, Laughlin & Raisch
ATTORNEYS

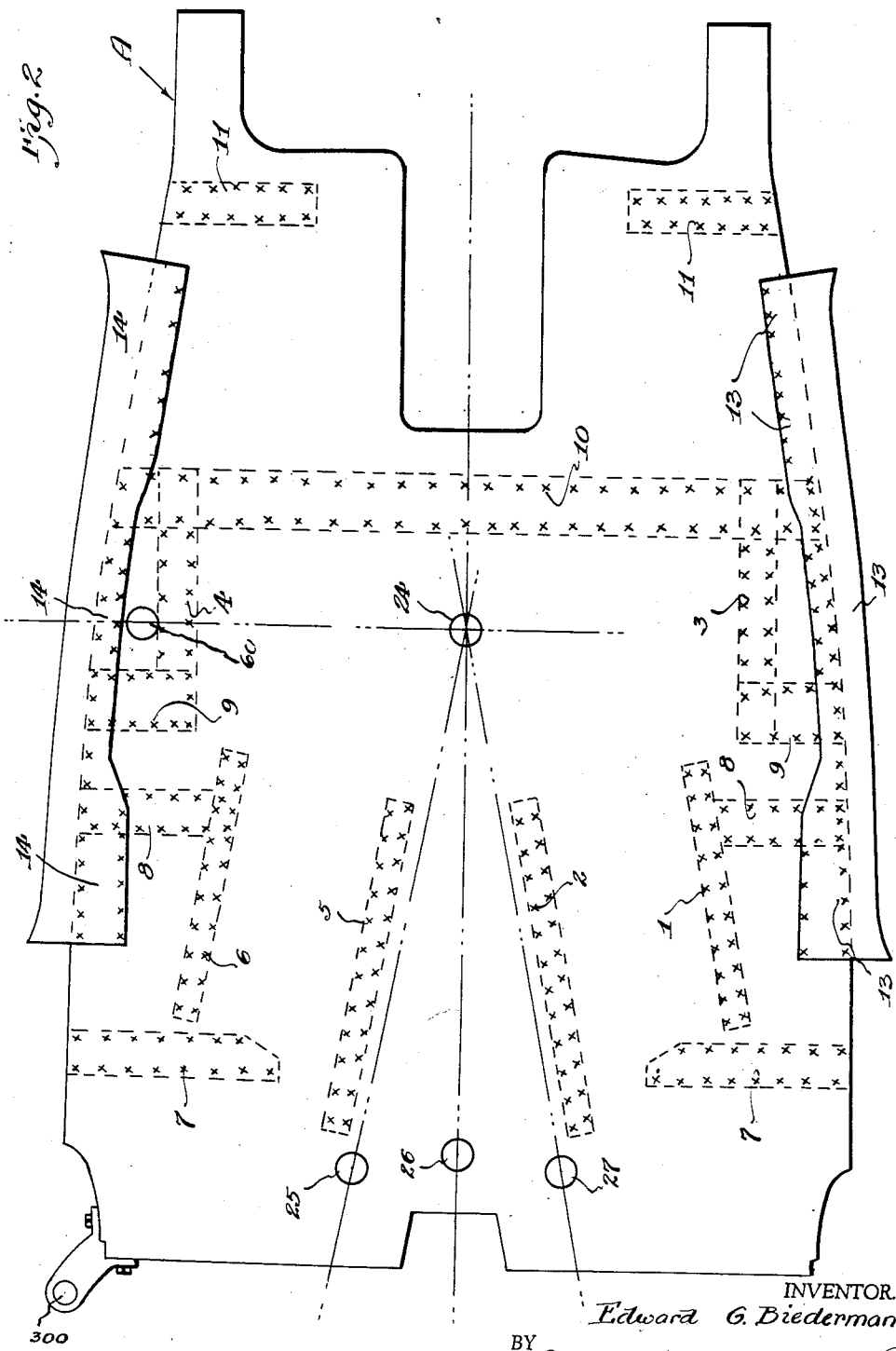

June 27, 1939.   E. G. BIEDERMAN   2,163,863
APPARATUS FOR WELDING
Filed Sept. 15, 1937   21 Sheets-Sheet 4
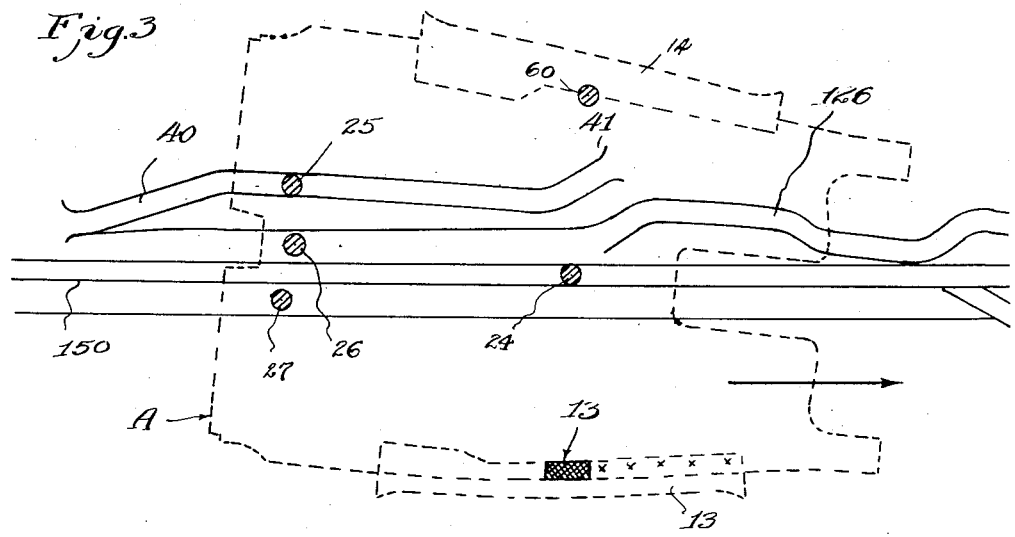
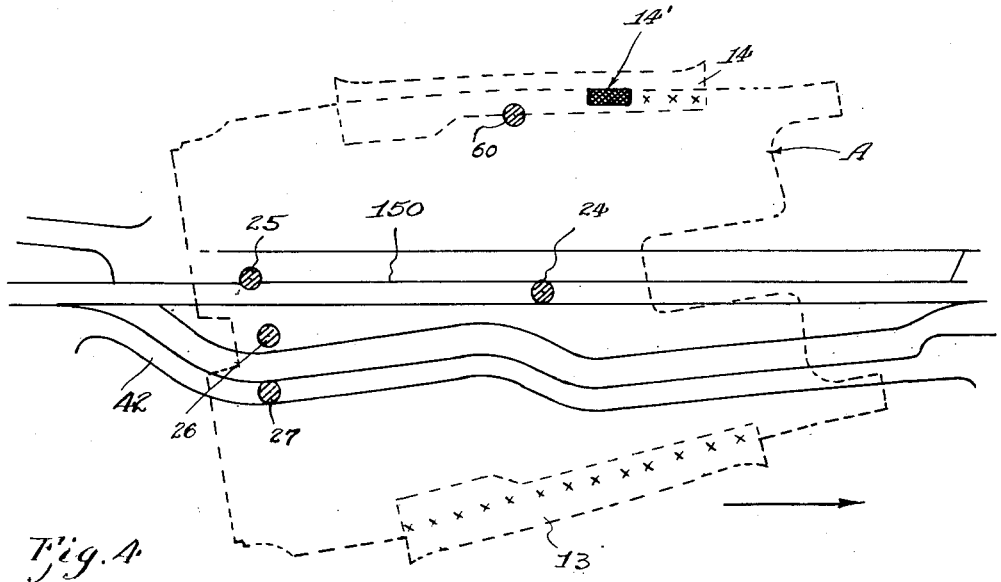
INVENTOR.
Edward G. Biederman
BY
Barnes, Kisselle, Laughlin & Raisch
ATTORNEYS

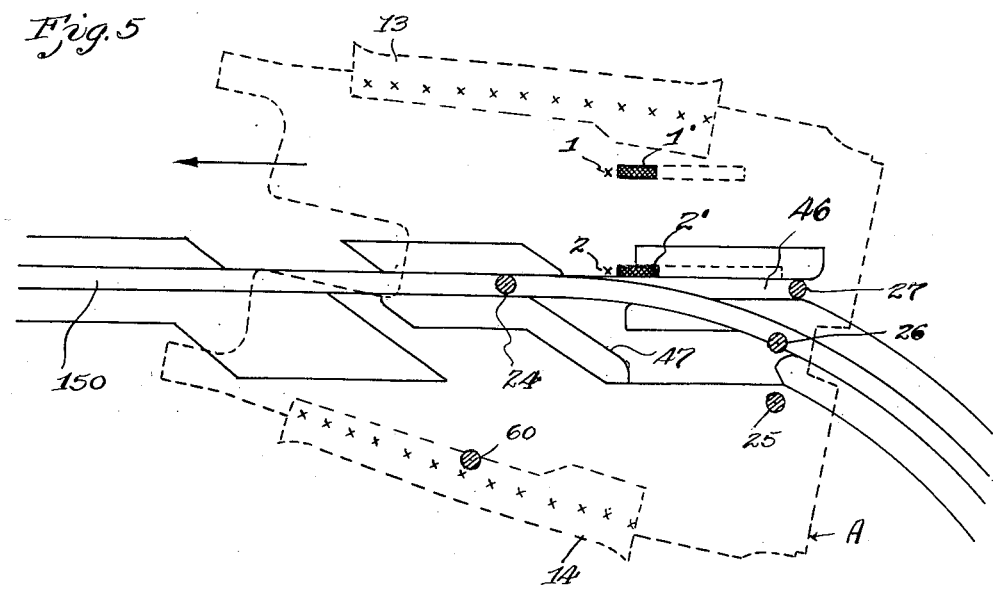

June 27, 1939.　　　E. G. BIEDERMAN　　　2,163,863
APPARATUS FOR WELDING
Filed Sept. 15, 1937　　　21 Sheets-Sheet 6
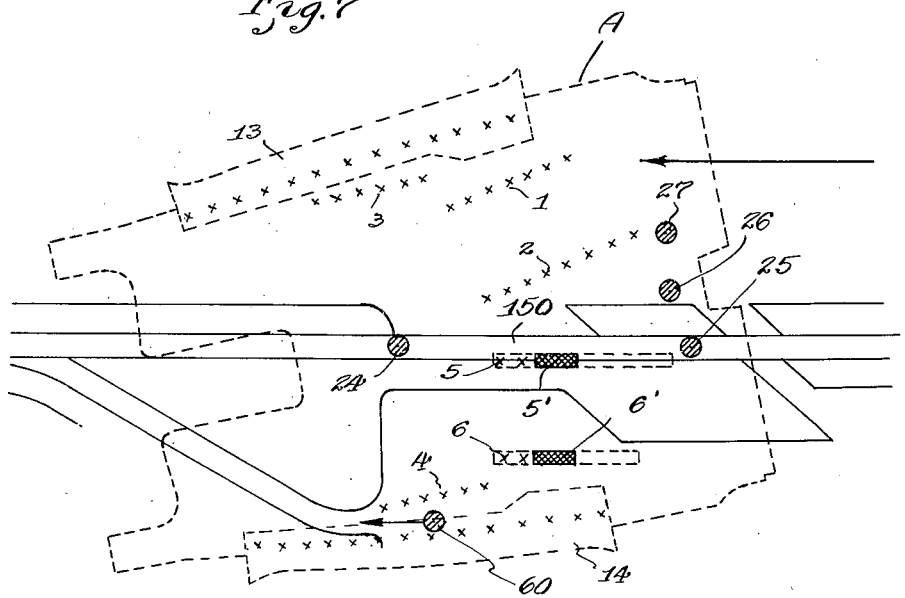
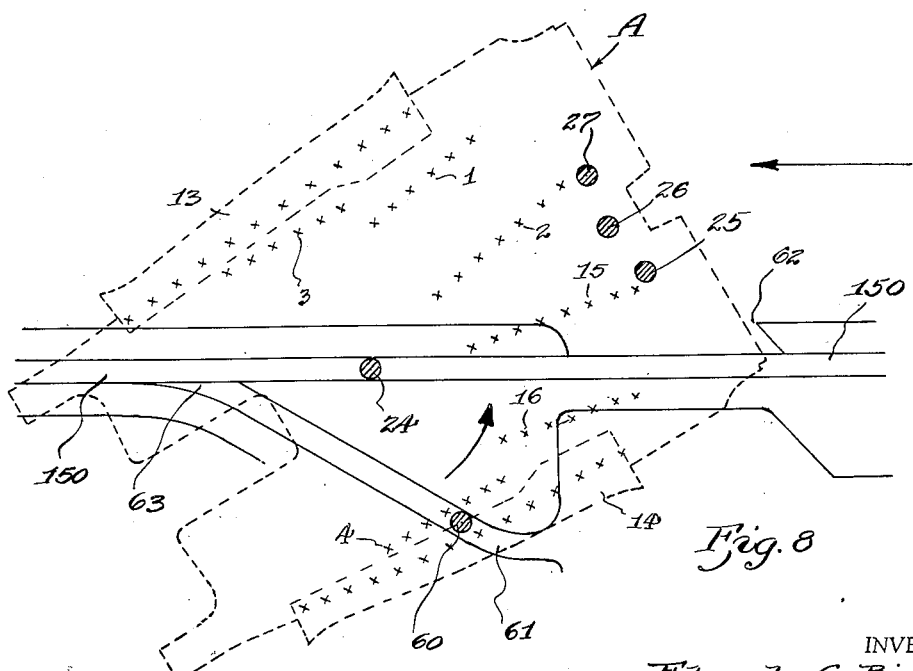
INVENTOR.
Edward G. Biederman
BY
Barnes, Kisselle, Laughlin & Raisch
ATTORNEYS

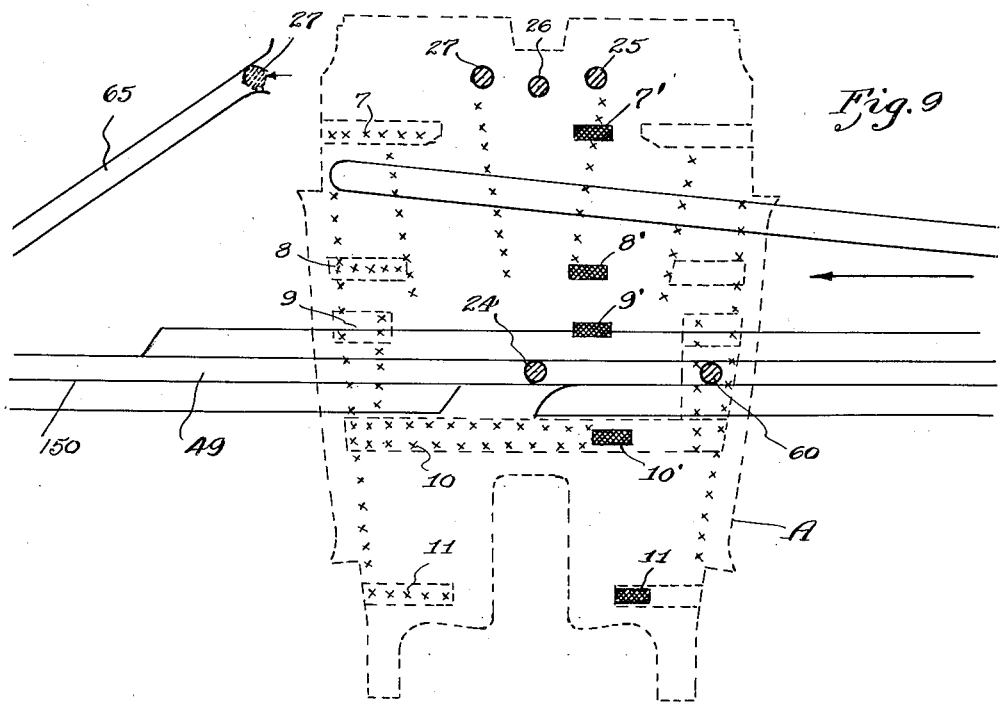
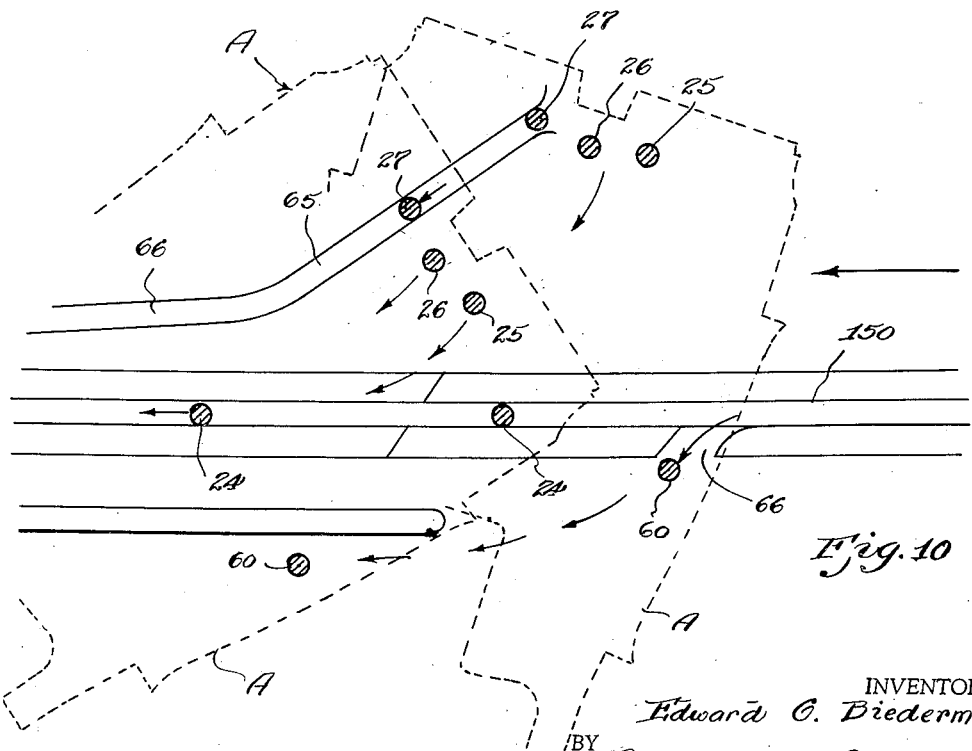

June 27, 1939.  E. G. BIEDERMAN  2,163,863
APPARATUS FOR WELDING
Filed Sept. 15, 1937   21 Sheets-Sheet 9

INVENTOR.
Edward G. Biederman
BY
Barnes, Kisselle, Laughlin & Raisch
ATTORNEYS

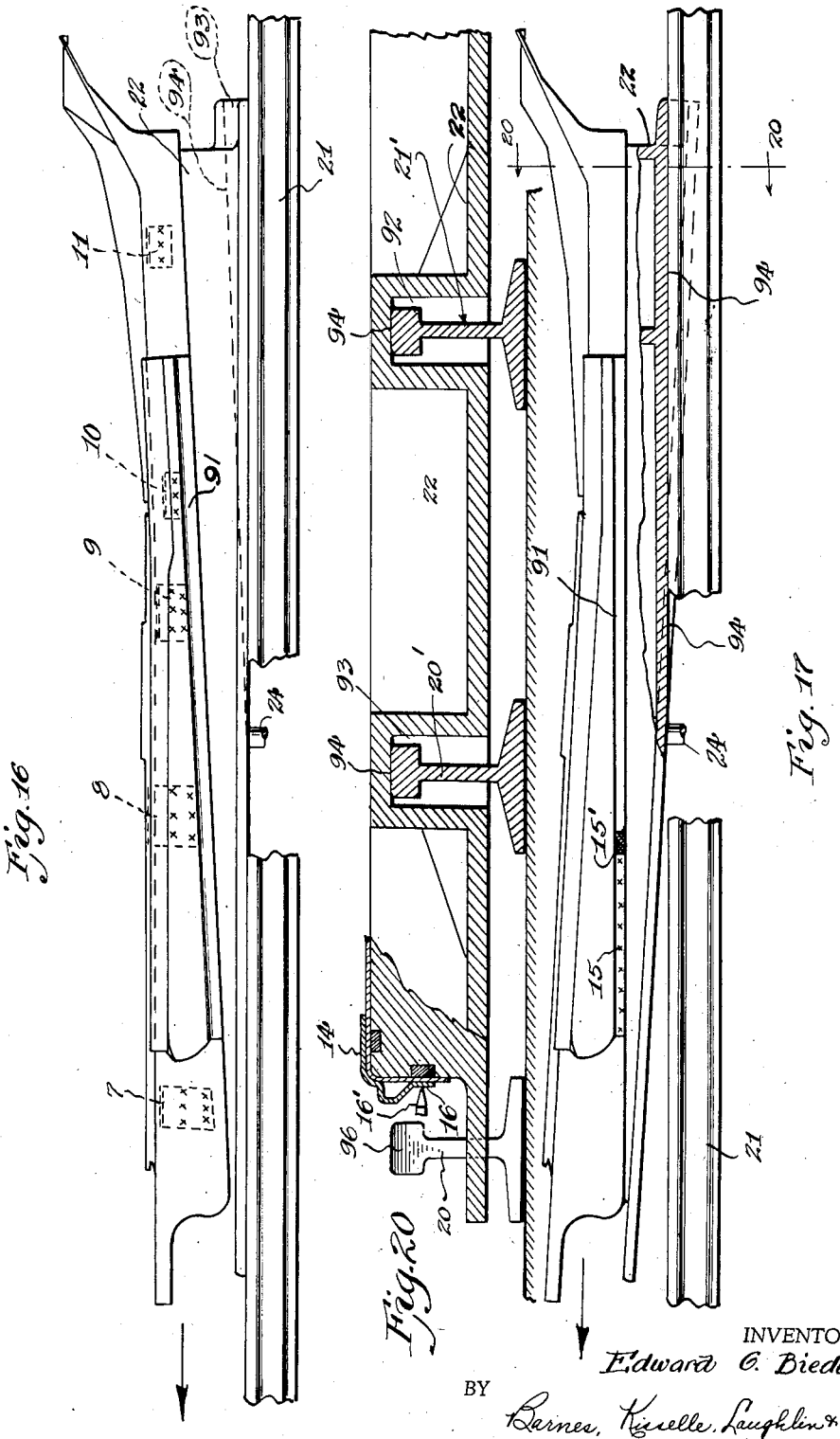

June 27, 1939.　　　E. G. BIEDERMAN　　　2,163,863
APPARATUS FOR WELDING
Filed Sept. 15, 1937　　　21 Sheets-Sheet 13
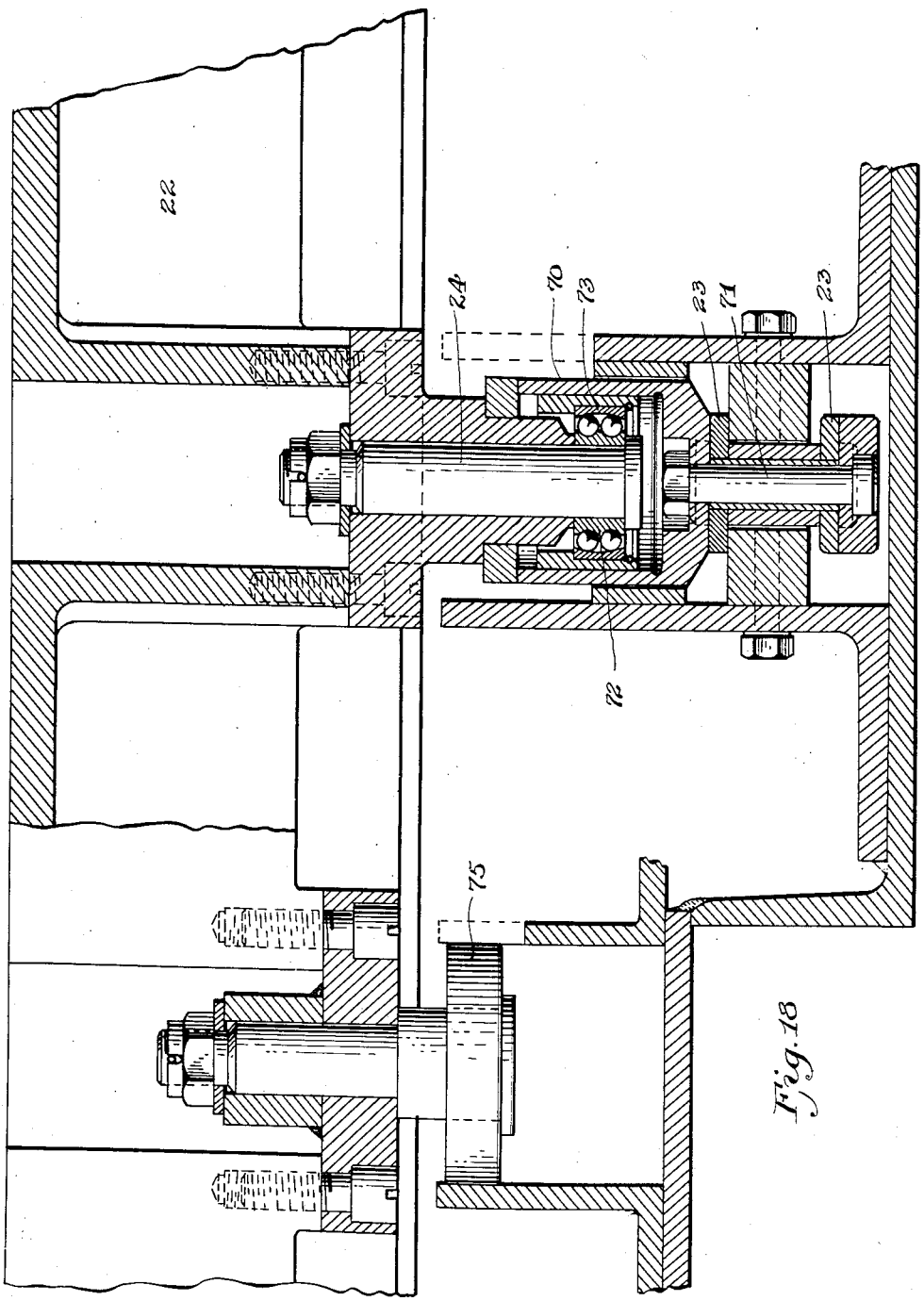
INVENTOR.
Edward G. Biederman
BY Barnes, Kisselle, Laughlin & Raisch
ATTORNEYS

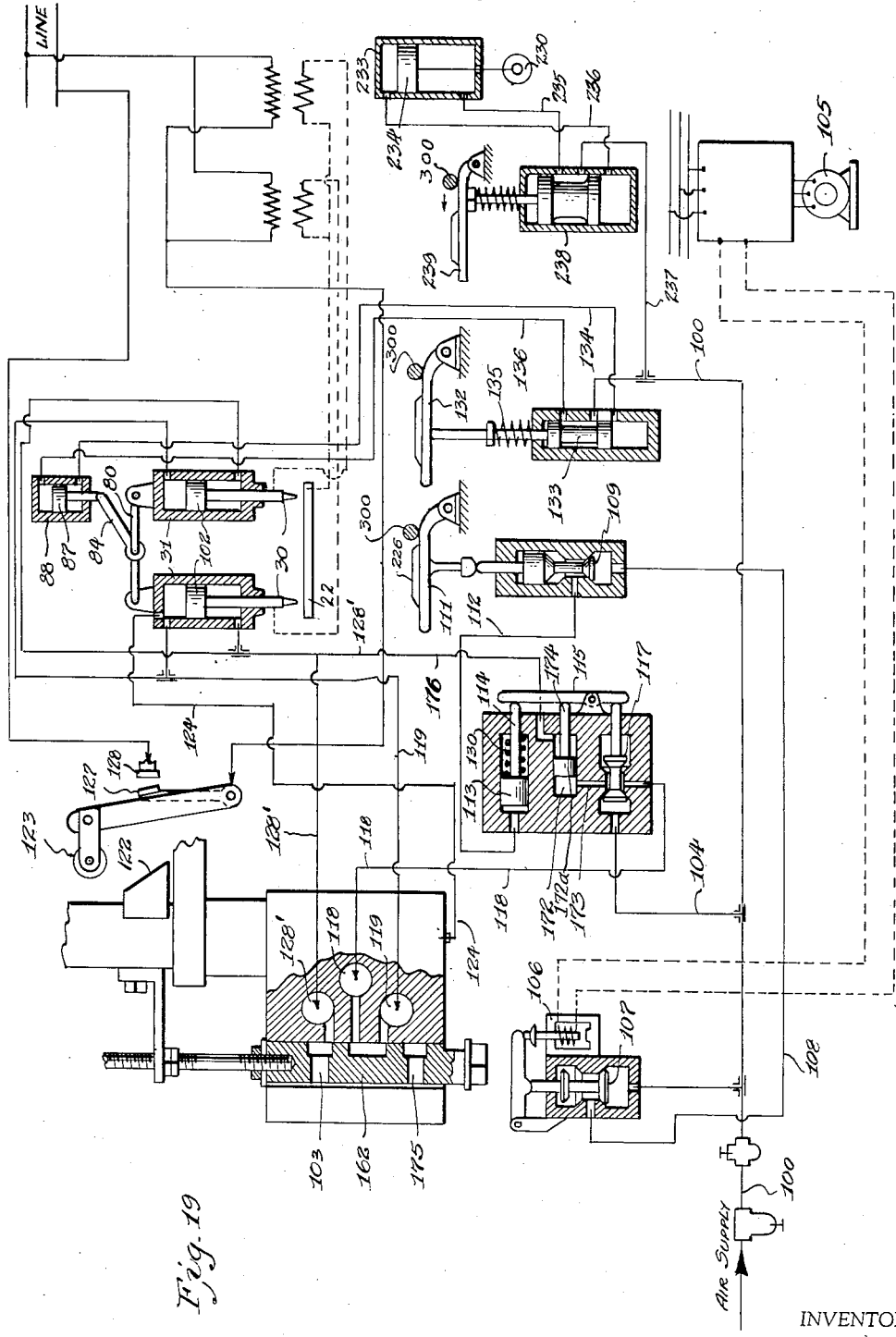

June 27, 1939.  E. G. BIEDERMAN  2,163,863
APPARATUS FOR WELDING
Filed Sept. 15, 1937    21 Sheets-Sheet 15
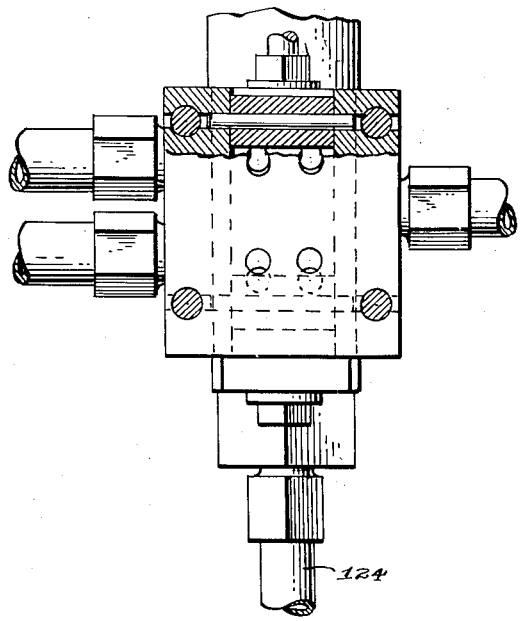
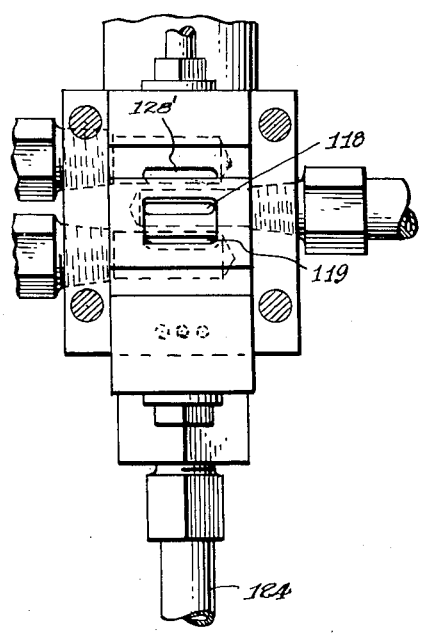
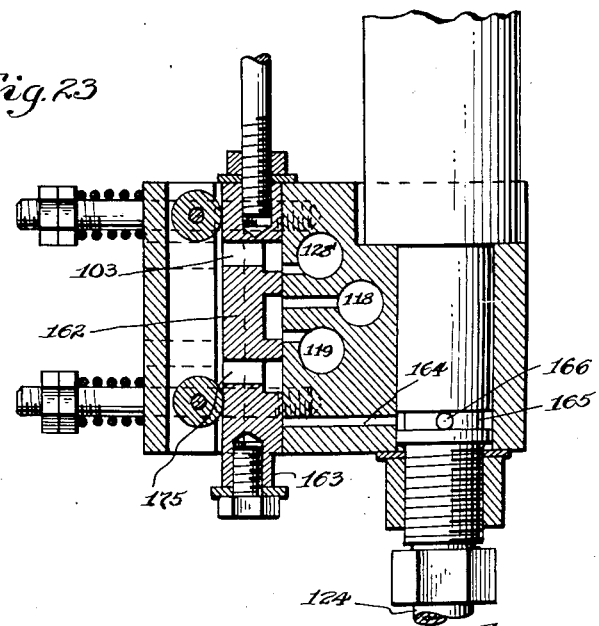
INVENTOR.
Edward G. Biederman
BY
Barnes, Kisselle, Laughlin & Raisch
ATTORNEYS

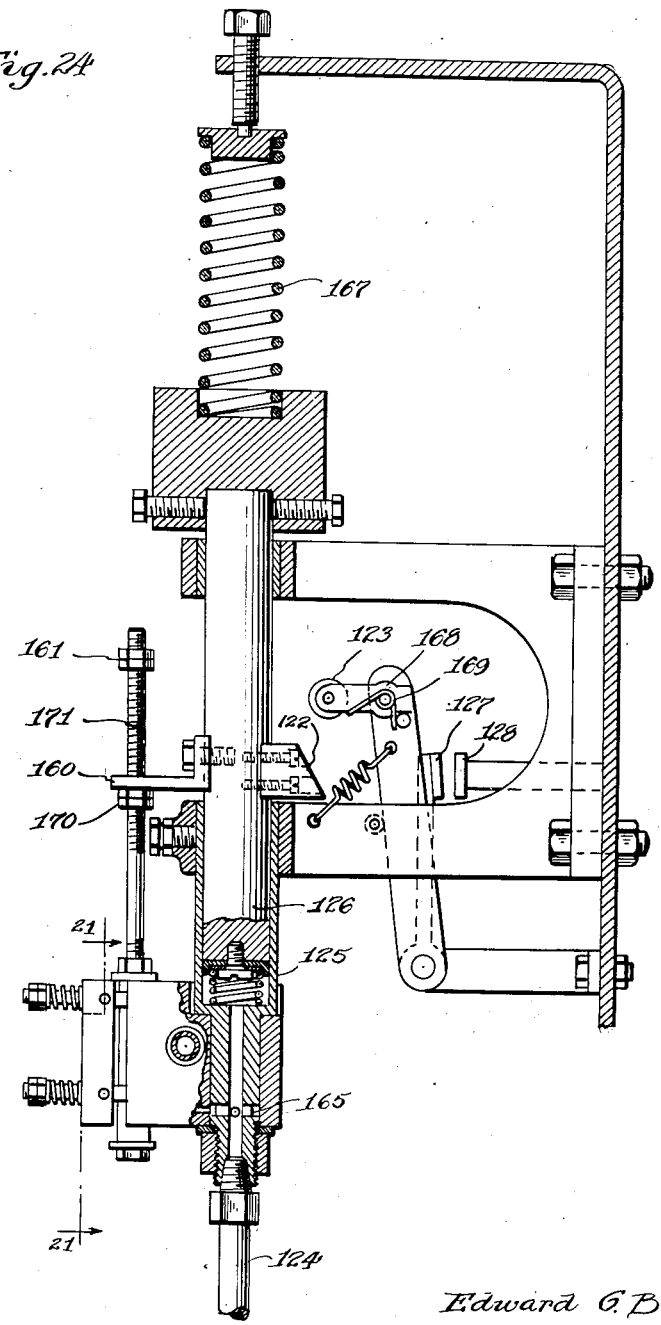

June 27, 1939.   E. G. BIEDERMAN   2,163,863
APPARATUS FOR WELDING
Filed Sept. 15, 1937   21 Sheets-Sheet 17

INVENTOR.
Edward G. Biederman
BY
Barnes, Kisselle, Laughlin & Raisch
ATTORNEYS

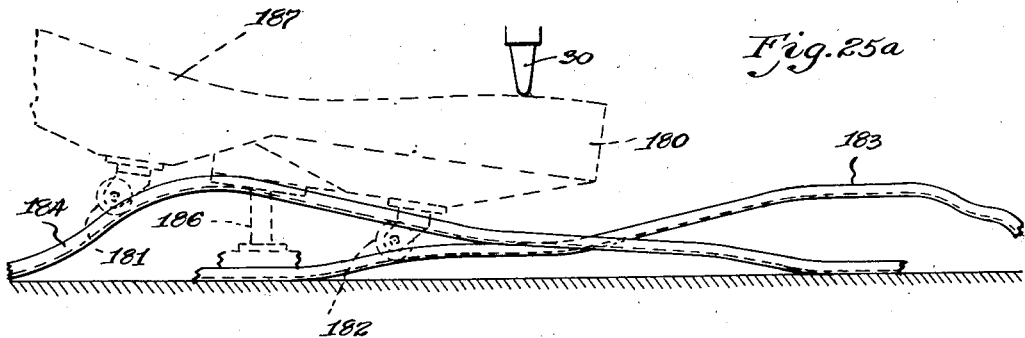
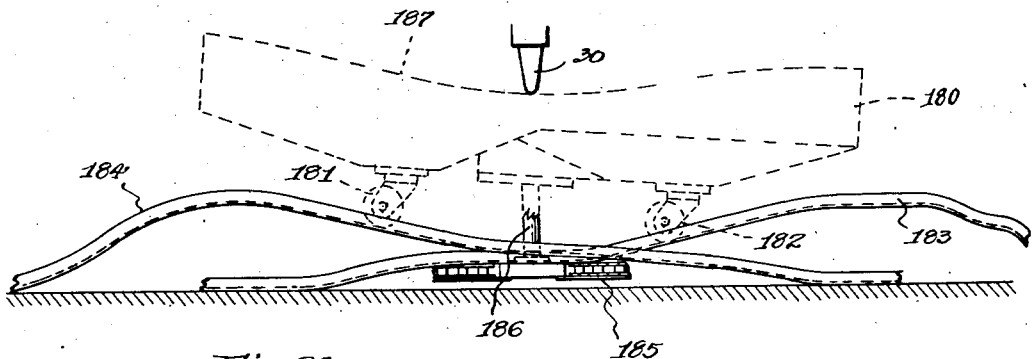
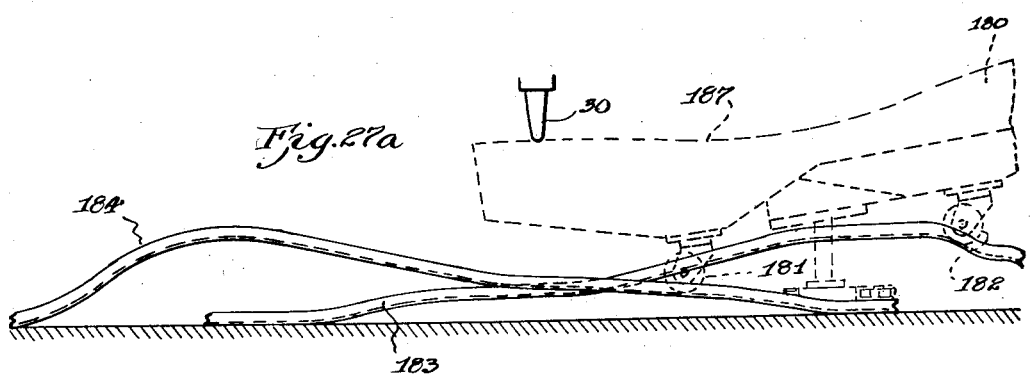

June 27, 1939.  E. G. BIEDERMAN  2,163,863
APPARATUS FOR WELDING
Filed Sept. 15, 1937   21 Sheets-Sheet 19
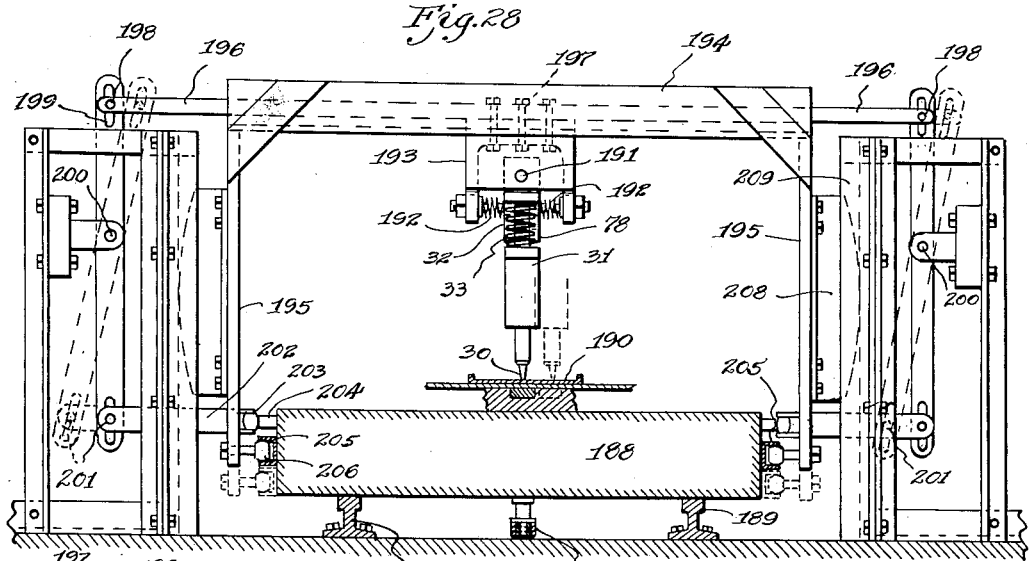
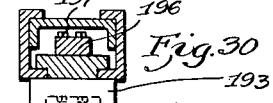
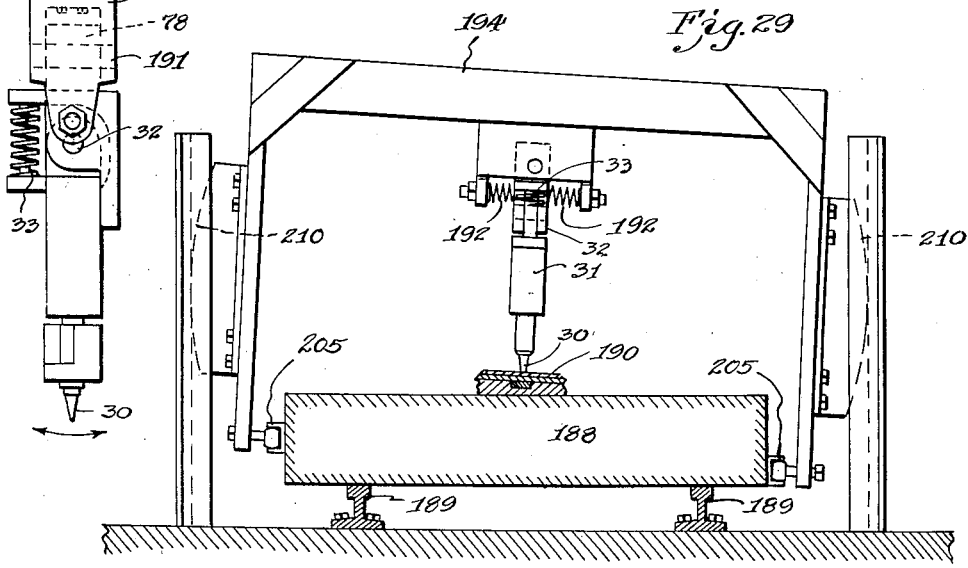
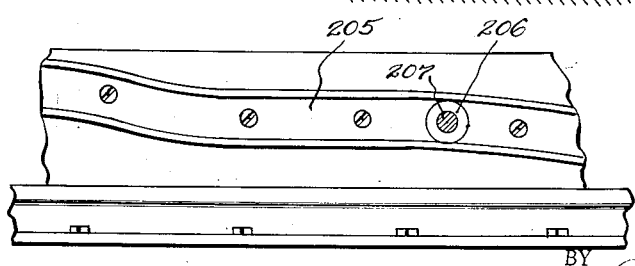
INVENTOR.
Edward G. Biederman
BY Barnes, Kisselle, Laughlin & Raisch
ATTORNEYS

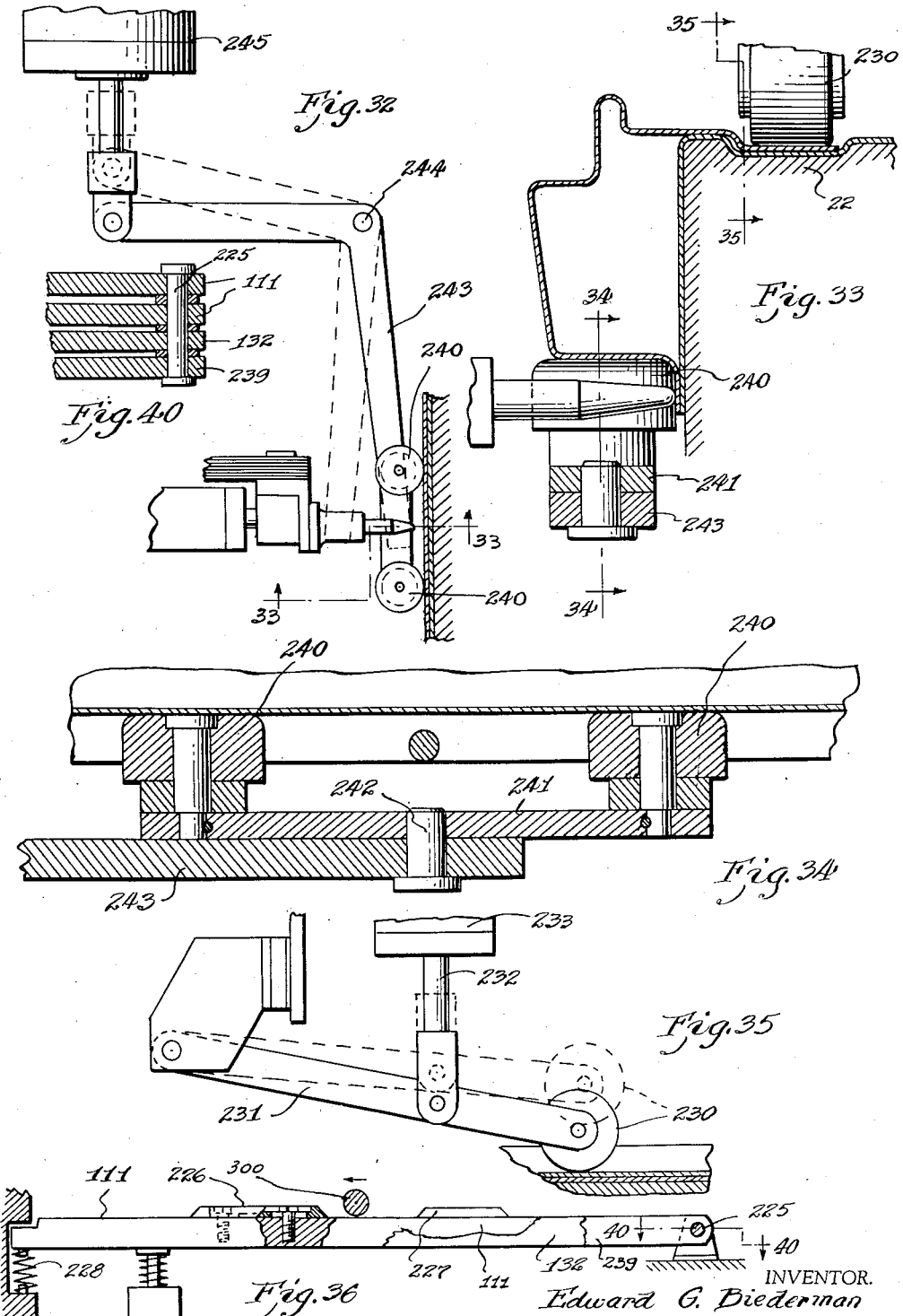

Patented June 27, 1939

2,163,863

UNITED STATES PATENT OFFICE 2,163,863

APPARATUS FOR WELDING

Edward G. Biederman, Detroit, Mich., assignor to General Motors Corporation, Detroit, Mich., a corporation of Delaware Application September 15, 1937, Serial No. 163,955

43 Claims. (Cl. 219—4)

This invention relates to an apparatus for welding.

Heretofore in the welding art where two or more pieces were welded together along a curved line it was common practice to weld along the line by means of a hand welding tool and the operator depended upon his manual skill to direct, shift and move the tool along the path it was desired to weld. Such welding depended primarily upon the skill of the operator and not infrequently the welding path traversed by the tool was inaccurate and out of line with the prescribed path of welding.

It is one of the objects of this invention to produce a method and apparatus for welding along curved, irregular, and broken lines, or series of such lines, which lines are either continuous or discontinuous and in either the same or different planes, so that the weld or series of welds will be accurately positioned on and along the prescribed and desired line of weld.

This invention also contemplates a method and apparatus for welding which is accurate and efficient in operation, and which obviates the need for depending upon the skill of any workman.

Heretofore in the art where two or more pieces of metal were welded together along non-parallel or intersecting lines, it was common practice to either pass the work through the welding head in one direction to weld one line and return the work back to its original position and again run it through the welding head to weld the next line or to manually move the welding tool first along one line of weld and then along another line. Such method and apparatus are both cumbersome and expensive, particularly where the welding head has to be moved first down one path of welding and then down another path.

It is an object of this invention to overcome the disadvantages inherent in the above-mentioned heretofore and presently used methods of welding. This object has been achieved by moving the work unidirectionally and preferably continuously, through a plurality of welding stations each of which welds its prescribed area or lines and by shifting the work during the welding operation or between successive welding operations to present separate but coplanar areas of the work to a welding station as well as areas at different elevations and in different planes to the same or different welding stations.

In the welding tools now commonly used, particularly the portable hand tools, considerable lengths of flexible cable and flexible hose for water and air are needed. Each piece of flexible cable and hose is several feet long. The twisting and bending stresses to which the flexible cable and air lines are subjected in operation require their frequent replacement. This makes the operation of the welding tool expensive not only because of the cost of the flexible cable and air lines and their replacement, but also because of the time lost by the operator and other workers along the production line while the cable or air line is being replaced.

It is an object of this invention to substantially reduce and practically eliminate this trouble and thus produce a more efficient welding machine. This object has been achieved by presenting the work to the welding tool instead of vice versa and this permits the use of a stationary rather than a portable welding tool which eliminates the need for any substantial lengths of flexible cable or air lines.

In the drawings:

Figs. 1A and 1B when placed end to end show a plan view of the combination welder and conveyor.

Fig. 2 is a top plan view of the work which is to be welded. This work comprises the floor pan of an automotive vehicle and its several reinforcing members.

Figs. 3, 4, 5, 6, 7, 8, 9 and 10 progressively show the travel of the welding jig through the several welding stations and the several positions to which the jig is shifted.

Figure 11:
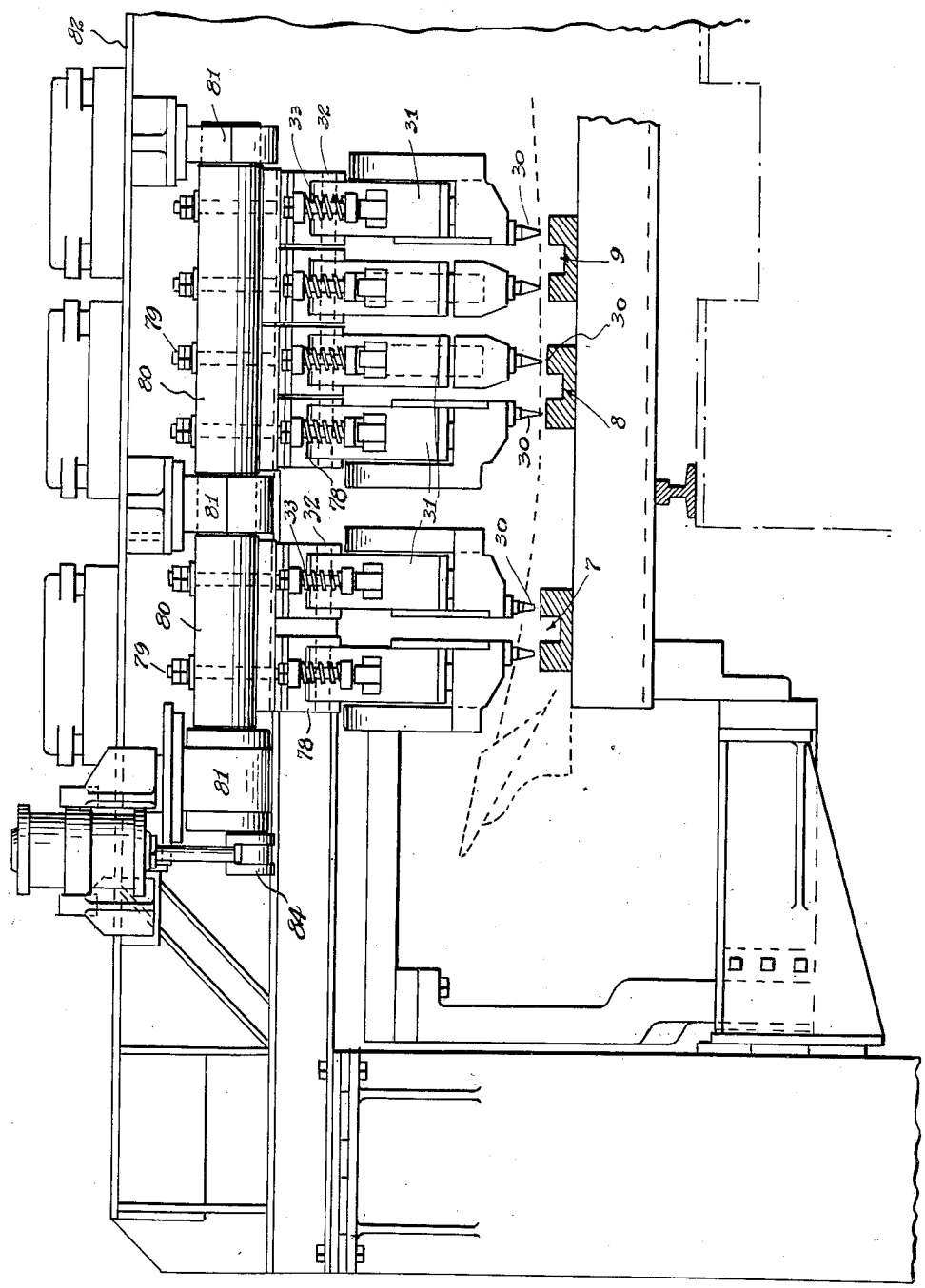

Fig. 11 is a fragmentary transverse section through the conveyor showing in elevation a portion of a welding station comprising a bank of welding tools.

Figure 12:
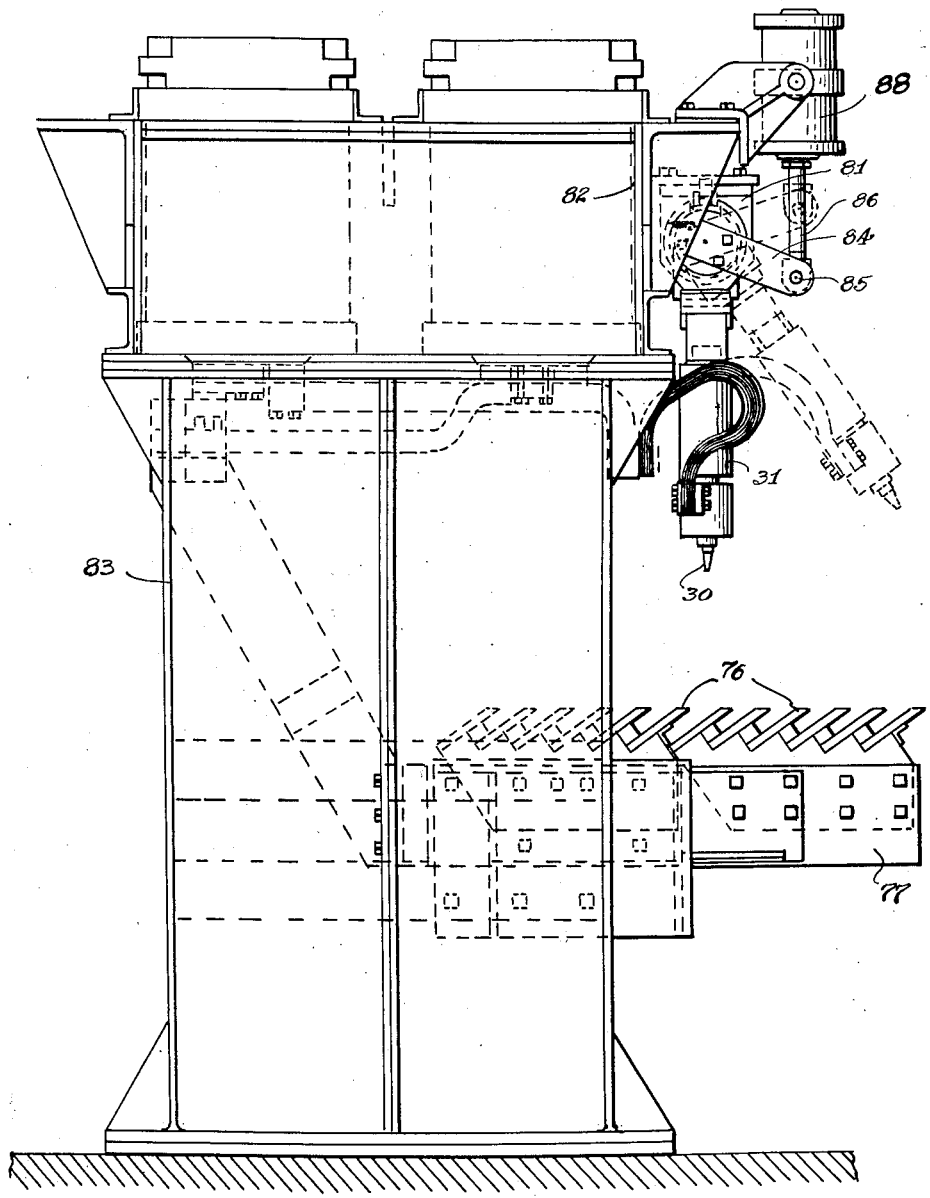

Fig. 12 is a side elevation of a welding station showing the welding tools pivoted so they can be swung to raised position to clear the high points or elevated areas of the work as it passes through the station.

Figure 13:
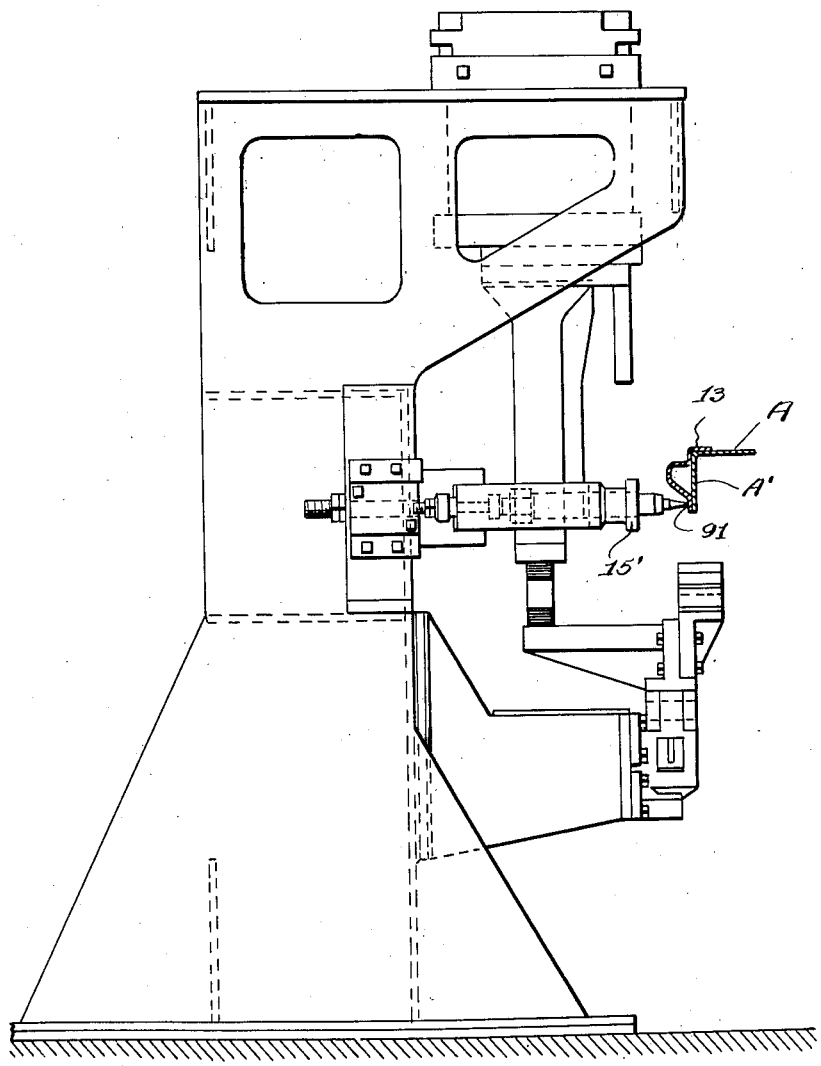

Fig. 13 is an elevation of a welding station showing the welding head mounted to pivot in a horizontal plane for welding the rocker panel to the floor pan.

Figure 14:
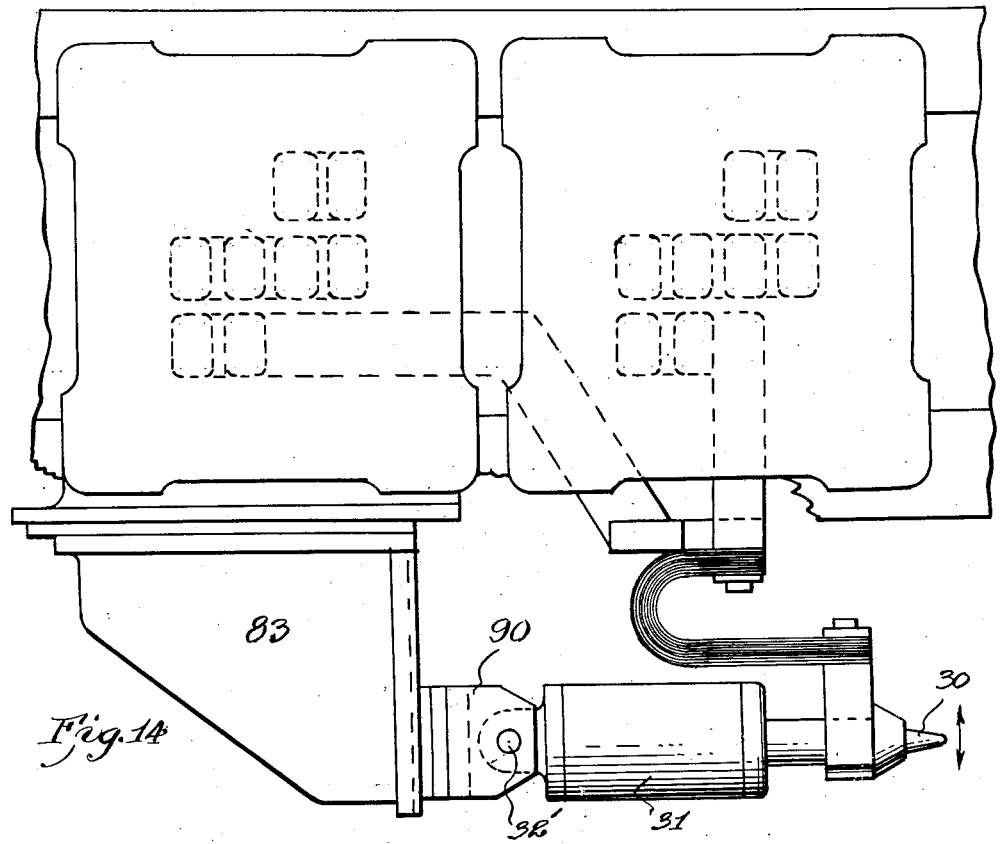

Fig. 14 is a top plan view of the welding station shown in Fig. 13 which also shows the welding tool pivoted to swing in a horizontal plane for welding along the vertical side of the floor pan.

Figure 15:
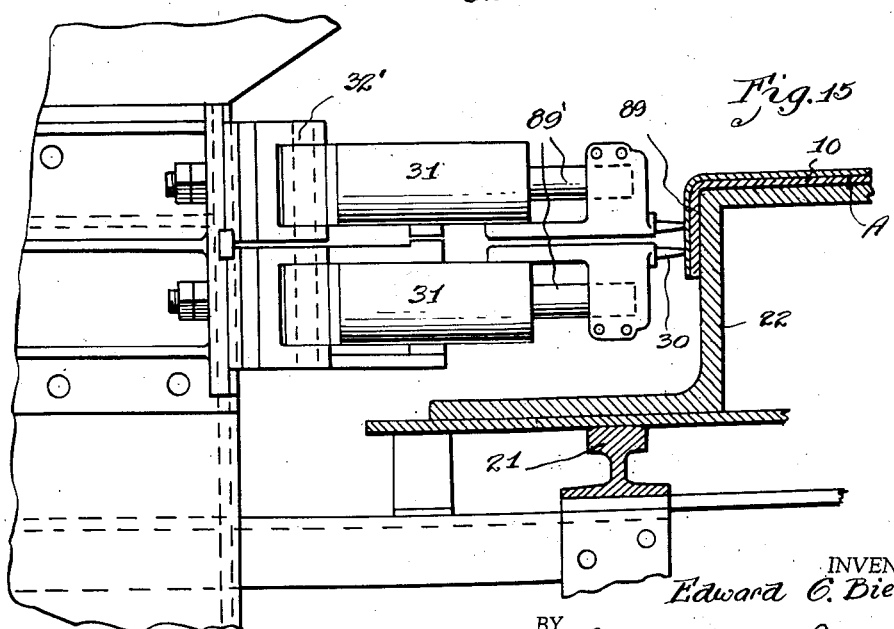

Fig. 15 is a fragmentary vertical section through the work and conveyor showing a pair of welding tools in elevation mounted to swing in a horizontal plane.

Fig. 16 is a side elevation partly in section of the track and jig showing the jig and work before the rocker panel is in position for welding.

Fig. 17 is a side elevation partly in section of the track and jig showing the jig and work with the portion of the jig to the rear of its pivotal connection with the conveyor chain lowered to bring the line along which the rocker panel is welded to the floor pan into a horizontal plane.

Fig. 18 is a fragmentary vertical section through the jig and conveyor showing the pivotal connection between the jig and the conveyor chain and also one of the cam rollers in position in one of the cam grooves for shifting the jig.

Fig. 19 is a diagrammatic showing of the welding circuit and the air lines and controls for operating the repeat spot welding guns.

Fig. 20 is a section along the line 20—20 of Fig. 17.

Figs. 21, 22 and 23 are detail views partly in section of the air operated automatic repeat valve.

Fig. 24 is a detail view partly in section of the contractor for making and breaking the electrical circuit for a welding tool.

Figure 25:
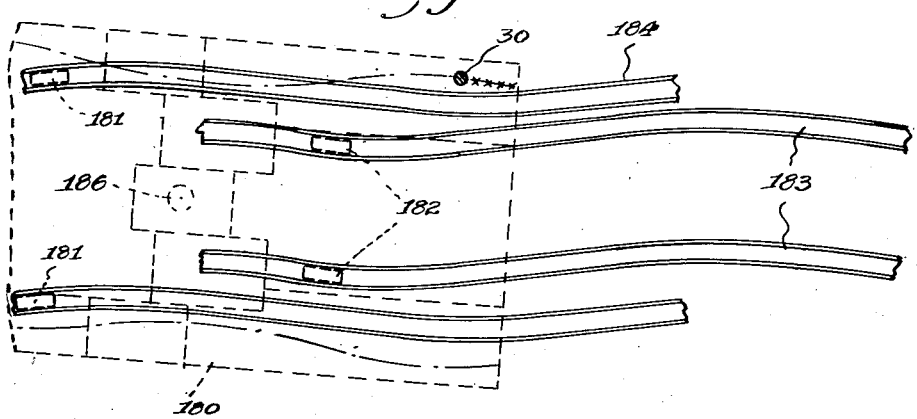
Figure 26:
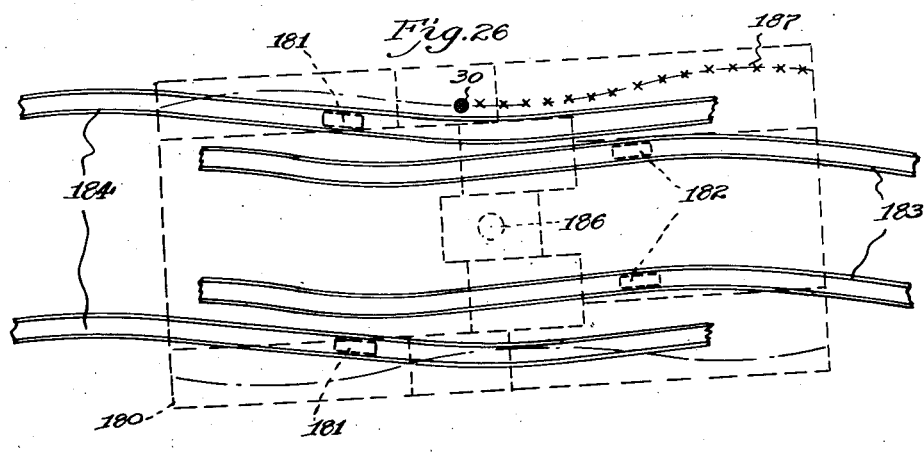
Figure 27:
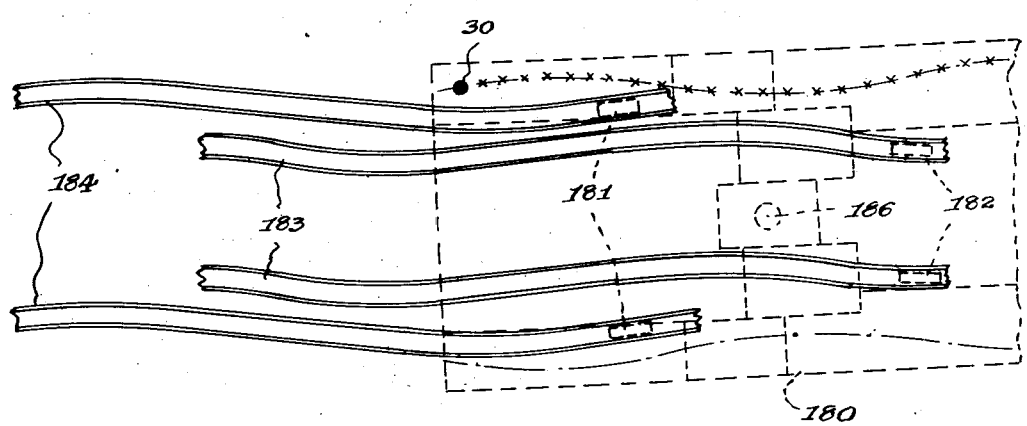

Figs. 25, 26 and 27 are plan views showing the successive positions of the jig along the track wherein the line of weld undulates in both horizontal and vertical planes.

Figs. 25A, 26A and 27A are side elevations corresponding respectively to Figs. 25, 26 and 27.

Fig. 28 is a vertical section partly in elevation through a welding station showing an arrangement wherein the welding tool is moved up and down and back and forth laterally of the work to weld along a line which undulates in a horizontal as well as in a vertical plane.

Fig. 29 shows an arrangement for shifting the welding tool holder so that the tool is at all times perpendicular to the face of the work.

Fig. 30 is a detail of the welding tool shown in Figs. 28 and 29.

Fig. 31 is a fragmentary side elevation of the jig showing the cam track used in the modified forms of Figs. 28 and 29.

Fig. 32 is a detail showing an air operated clamping roller controlled during the movement of the work for clamping the lower edge of the rocker panel and pan against the vertical side wall of the jig.

Fig. 33 is a vertical section along the line 33—33 of Fig. 32 which also shows a clamping roller for the top of the rocker panel.

Fig. 34 is a vertical section along the line 34—34 of Fig. 33.

Fig. 35 is a vertical section along the line 35—35 of Fig. 33.

Fig. 36 is a detail view showing a plurality of cam levers such as are used for opening the trigger valve in the main air line for the repeat spot welding tools and for operating the valves which control the air operated work clamp and the air operated cylinder and piston for swinging the welding tools upwardly to clear the high points on the floor pan.

Figure 37:
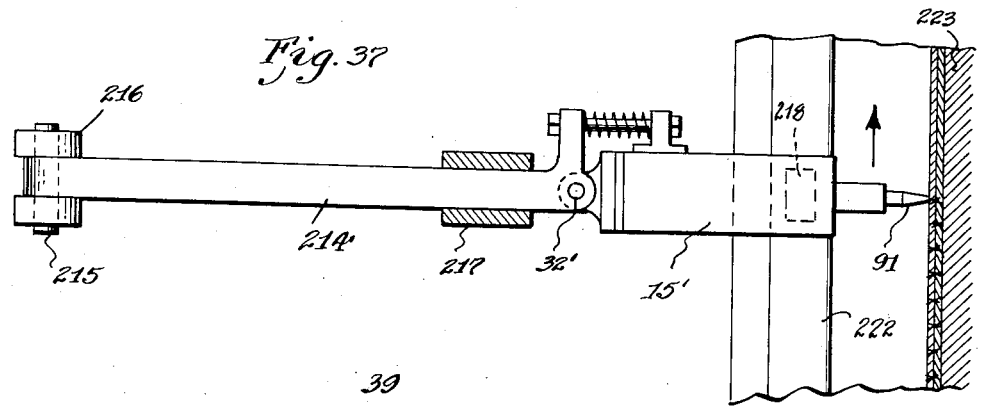

Fig. 37 is a fragmentary plan view of the welding tool for welding two members together along an undulating line on the vertical faces of the members.

Figure 38:
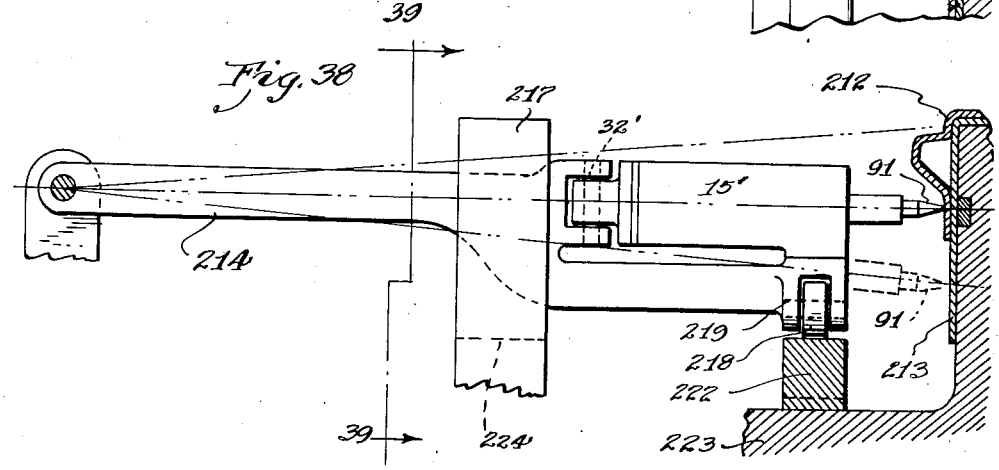

Fig. 38 is a side elevation of the structure shown in Fig. 37.

Figure 39:
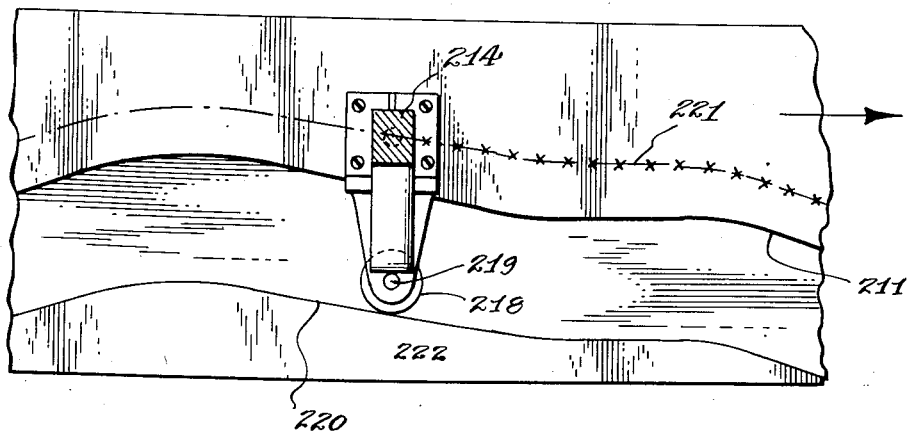

Fig. 39 is a side elevation partly in section along the line 39—39 of Fig. 38.

Fig. 40 is a vertical section along the line 40—40 of Fig. 36.

To the end that the invention and apparatus which comprises this invention can be described and illustrated, there is shown a floor pan A (Fig. 2) of an automotive vehicle to the underside of which has been spot welded a plurality of members 1 to 11 inclusive and 13, 14 along the lines indicated by the crosses (X). While these members all serve as reinforcements for the pan A, 3 and 4 are the seat adjustor anchor plate and 13 and 14 are rocker panels. It will be noted that the members 7, 8, 9, 10 and 11 are welded to the floor pan A along parallel lines running approximately perpendicular to the longitudinal center line of the floor pan A. It will also be noted that pieces 13 and 14 have been welded along curved lines which correspond to the curved or side edges of the pan A. Reinforcements 1, 2, 5 and 6 are welded along lines which are oblique to the longitudinal center line of the floor pan A. Pieces 3 and 4 are welded along lines parallel to the longitudinal center line of the pan A.

The apparatus for welding these various parts to the floor pan consists of parallel inner and outer rails 20 and 21 respectively which form a continuous trackway upon which a plurality of jigs 22 are slidably mounted. The jigs are propelled about a trackway by a conveyor chain 23 which can be driven by any suitable driving mechanism 19. The conveyor chain 23 preferably moves continuously. Continuous motion is preferred particularly where the mass of jigs and work is great as in the instant case, and considerable inertia would have to be overcome were the conveyor chain run intermittently. Where such large mass must be propelled, the resultant inertia would cause considerable undesirable jerking if the conveyor were intermittently stopped and started.

Each of the jigs is connected to the conveyor chain by means of a universal joint so that the jig can swivel or rotate in a horizontal plane and also tilt upwardly and downwardly. The connection is shown in detail in Fig. 18 and comprises a hollow bearing cylinder 70 which is seated upon an upper link of the chain 23 and fixed to the chain 23 by the bolt 71. The bearing cylinder 70 carries a self-aligning ball bearing member having an inner race 72 and an outer race 73. A driving pin 24 is secured to the inner race and to the jig 22. The bearing faces of the races 72 and 73 are portions of a sphere and thus give the connection between the jig 22 and the chain 23 a universal action, that is, the jig 22 can swivel in a horizontal plane and also tilt up and down. The purpose of the tilting as well as the swiveling action on the part of the connection is explained below.

The several reinforcements and the floor pan are assembled in their respective places on the jig while the jig is continuously traveling along the tracks at any suitable predetermined speed. The jigs can be loaded and unloaded at any suitable place. For purposes of description, the loading and unloading stations will be positioned at the right-hand curved end of the trackway, Fig. 1B.

Each jig has fixed thereto a series of depending pins 25, 26, 27 and 60 each provided with a roller 75 which cooperate with the cam faces described below for shifting the jig and work about the connection 24 to present different areas to the welding tools at different stations.

It is understood that the conveyor chain 23 simultaneously propels a plurality of jigs about the endless circuit defined by the conveyor chain 23 and tracks 20 and 21. For purposes of description, the various reinforcements are secured to the floor pan A by spot welding. However, it is specifically understood that any one or more of the well-known types of welding, such as continuous line welding, relief welding, butt welding, arc welding, and others, can be performed at any of the stations. For purposes of description there is shown a preferred station for spot welding the various members to the floor pan. This station comprises a plurality of welders each of which is identical to the welder described in my copending application Serial No. 157,769, filed August 6, 1937.

The lower electrode consists of the jig 22 which slides along the tracks 20 and 21. At each station the lower electrode slides over a plurality of electrically conducting copper brushes 76 connected to the bus bar 77 which in turn is connected to the secondary winding of the transformer. The upper electrode, which is suitably connected in electrically conducting relation with the secondary of a transformer, comprises an electrode 30 reciprocably mounted in the cylinder 31. As in my copending application, above mentioned, the electrode 30 reciprocates rectilinearly in the cylinder 31. Each cylinder 31 in turn is pivotally mounted on pin 32 carried by support 78 so that it can swing vertically in the direction of travel of the work and return. The return of the cylinder 31 and electrode 30 is effected by means of a compression spring 33. The reciprocation of the electrode 30 is effected by fluid pressure, preferably by means of compressed air, and the reciprocation of the electrode 30 is timed or synchronized with the switch that makes and breaks the welding circuit. The reciprocation of the upper electrode 30 as well as the time making and breaking of the welding circuit can be effected by any of the well-known mechanical, electrical or fluid pressure operated mechanisms and even can be done manually.

As shown in Figs. 11 and 12, a plurality of banks of welding tools are carried by supports 78. The supports 78 are secured by bolts 79 to a tubular shaft 80 which is journaled in the support brackets 81 which are fixed to the top 82 of the welding station support frame 83. A crank 84 is fixed to one end of the shaft 80 and pivotally connected as at 85 to a piston rod 86. The piston rod 86 is connected at its upper end to a piston 87 (Fig. 19) reciprocably mounted within the cylinder 88. The cylinder 88 is connected by air lines with a source of air under pressure. As described more in detail below, the welding tools 30, 31 are arranged to be swung upwardly to the dotted line position shown in Fig. 12 to clear certain raised portions of the floor pan such as the propellor shaft tunnel.

Reinforcement members 7, 8, 9, 10 and 11 each have a vertical flange 89 which extends downwardly along the vertical side flanges of the floor pan A (Fig. 15). Thus the welding of the flanges 89 to the side flanges of the floor pan A is performed in a plane perpendicular to the top of the floor pan A. To perform these welding operations the same type of welding head is used as above described but the head is mounted so that it can swing back and forth in a horizontal plane. To this end the cylinders 31 are pivotally supported on the vertical pins 32'. The vertical pins 32' are fixed in brackets 90 which are bolted to the welding station support frame 83.

The rocker panels 13 and 14, as shown in Figs. 13, 16 and 17, are also welded to the vertical flange A' of the floor pan A along the lower edge 91. For this purpose a welding tool is positioned at each side of the trackway and mounted on a vertical axis to swing in a horizontal plane in a manner identical with that described in regard to the welding tools shown in Figs. 14 and 15.

However, the edge 91 of the rocker panel, as viewed in Fig. 16, extends rearwardly and upwardly from a point slightly in back of the front edge of the floor pan and thus is positioned obliquely to the top of the track 21 which is in a horizontal plane. In other words, the edge 91 runs obliquely to the plane of the floor pan and since it is preferable to perform each line of spot welds on the level or in a horizontal plane, provision is made for tilting the jig and floor pan so that the side edge 91 of each rocker panel is positioned on the level or in a horizontal plane. To this end the bottom face of the jig is provided with a pair of undercut grooves 92 and 93 which are inclined forwardly of the jig, Fig. 17, so that the upper face 94 extends parallel to the lower side edges 91 of the rocker panels. The tapered undercut grooves 92 and 93 are spaced inwardly of the main tracks 20 and 21. As shown in Fig. 1B, a pair of tracks 20' and 21' having a narrower gauge than the main tracks 20 and 21, are positioned along a portion of the course through which the jig and work travel during the welding of the lower side edges of the rocker panel. The main tracks 20 and 21, as shown in Fig. 1B, are discontinued and do not extend along the portion of the pathway of the trackway covered by the narrow gauge rails 20' and 21' opposite welding tools 15' and 16' which weld the side edges of the rocker panels. The ends of the tracks 20 and 21 are tapered as at 95 and 96. The taper 95 is forwardly and downwardly of the direction the jig travels and taper 96 is forwardly and upwardly of the direction of travel of the jig. The upper faces of tracks 20 and 21 upon which the jig rides, are in a horizontal plane and at the same level throughout the entire course except for tapered portions 95 and 96. The upper faces of tracks 20' and 21' are also in the same horizontal plane as the top faces of tracks 20 and 21. The jig is supported and slides along the rails 20 and 21 until it reaches the narrow gauge tracks 20' and 21'. As the rear portion of the jig rides down the tapered ends 95 of tracks 20 and 21, the rear end of the jig is lowered and since the undercut grooves 92 and 93 are now over narrow gauge rails 20' and 21', the jig is lowered until the upper faces 94 of the grooves seat upon the top faces of the narrow gauge rails 20' and 21'. As soon as the narrow gauge rails engage the top faces 94 of the grooves 93 the side edges 91 of the rocker panels are positioned horizontally. Thus as the jig and work move along tracks 20' and 21', the welding tools 15' (Fig. 13) and 16', swing to and fro about their vertical axes and weld the side edge 91 as indicated by the crosses in Fig. 17. As soon as the bottom rocker panels have been welded the jig rides off of the narrow gauge rails 20' and 21' and the rear portion of the jig travels up the incline 96 on to the rails 20 and 21 so that the top face of the floor pan is again positioned in a horizontal plane.

As the floor pan travels along the narrow gauge tracks 20' and 21', the jig must also be shifted horizontally because, as shown in Fig. 2, the side bottom edge of the rocker panels follows the curved contour of the floor pan A. The shifting of the jig and work is accomplished by the pin and roller 25 first engaging in the cam groove 97 while one rocker panel is welded and the pin and roller 27 engaging in the curved cam groove 98 while the other rocker panel is being welded to the pan along its lower side edge. The grooves 97 and 98 cooperate with the rollers 25 and 27 to shift or swivel the jig and work about its pivotal connection with the conveyor chain so that the curved lower edge 91 of the rocker panels are passed substantially rectilinearly through the welding tools during the welding operation. Tracks 20' and 21' have ample side clearance in grooves 92 and 93 in jig 22 to permit this horizontal shifting of jig 22.

The schematic layout of the welding stations, the electrical welding circuit, and the mechanism for reciprocating the electrodes by fluid under pressure and for timing the making and breaking of the welding circuit is shown schematically in Fig. 19. Referring to this figure there is shown but a single welding station comprising two welding tools, but it is understood that all of the welding stations of this machine are connected in a similar fashion with the same source of compressed air and the same source of electrical energy.

As shown in Fig. 19, the main air supply line is referenced 100. The drive motor for the conveyor is indicated at 105. As soon as the motor control switch is closed to start the motor a solenoid 106 opens valve 107 so that live air now passes from main line 100 to line 108 which is controlled by poppet valve 109. Preferably the poppet valve control for line 108 is operated by a pin 300 fixed to each jig. Each welding station is provided with one or more levers 111 each having one or more cams 226, 227 for each welding tool. The lever 111, as the jig passes through the station is cammed downwardly by the pin 300, e. g., to open poppet valve 109. This places live air line 108 in communication with line 112. The compressed air in line 112 acts against piston 113 to shift plunger 114 to the right which acts through a lever 115 to open poppet valve 117. This places air line 118 in communication with the air line 104 which always contains live air. Poppet valves 109 and 117, of course, remain open as long as pin 300 rides along and depresses a cam on lever 111. At this time line 118 communicates through the repeat valve with line 119. The live air now enters the top of the cylinders 31, depressing pistons 102 and thereby projecting upper electrodes 30 downwardly to clamp the work against the lower electrode which is the jig 22.

At this time that portion of the cylinder 31 below piston 102 is open to atmosphere through line 128' and exhaust port 103. The air pressure then backs up through the conduit 124 to the air contactor cylinder 125. This raises the air contactor piston 126 and cam 122 passes over the roller 123 closing contacts 127 and 128 thereby switching on the current for the timed period. Current now flows through the secondary circuit of the transformer and through the electrodes 30, 22 and the work to spot weld the work as it moves along with the jig. Then as the cam 122 drops off the end of the roller, the collar 160 contacts with the nut 161, pulling up the slide valve 162 and thereby causing the notch or reduced end 163 of valve 162 to register with the exhaust passageway 164 connected by groove 165 and port 166 with the bottom of the cylinder, thereby immediately releasing the air pressure behind the piston 126 and allowing the spring 167 to promptly snap the cam 122 back past the roller 123 carried on the pivoted arm 168 which moves out of the way by reason of the spring and pin arrangement 169. When the valve 162 is in its uppermost position, the air supply has been turned into the upper conduit 128 thereby sending the air below the piston 102 and thus pulling the electrodes apart. The spring 167 snaps the contactor piston 126 back and the collar 160 strikes the nuts 170 on the stem 171 and forces the valve 162 down, again turning the air supply back into the conduit 119 which leads above the piston 102 which brings the electrodes together again, at the same time shooting the air via line 124 into the air contactor cylinder to properly actuate the timing of the electric current.

This repeat welding cycle continues as long as poppet valve 109 is open. As soon as pin 300 rides off of the cam on lever 111, poppet valve 109 closes and shuts off the live air from line 112 which permits spring 130 to move piston 113 to the left which in turn immediately closes poppet valve 117. Thus shuts off line 118 from the live air line 104 and thereby cuts out the operation of the welding tool until lever 111 is again depressed by the pin 300 on the next oncoming jig. As soon as the trigger 115 is released, the air that is supplied to the top of the piston is cut off. The trigger should not cut off the air until the weld has been completed. This result is accomplished by a non-beat control adapted to prevent the cutting off of the air until the welding current is off.

This non-beat arrangement comprises a cylinder 172 which communicates with line 104 through conduit 173 whenever valve 117 is open. This moves piston 172a to the right which through plunger 174 holds trigger 115 and valve 117 in open position. When pin 300 rides off of the cam lever 111 thus closing valve 109 and shutting off the live air from line 112 which permits the spring to retract piston 113 and plunger 114, nevertheless plunger 174 remains projected and holds poppet valve 117 open. However, as soon as the collar 160 on the upstroke of the contactor piston 126 strikes nut 161 and pulls valve 162 upwardly to place line 128 in communication with line 118 which raises piston 102 to retract the electrode 30 (at this time line 119 is open to atmosphere through port 175 in valve 162), then live air also flows from conduit 128 through conduit 176 into cylinder 172 retracting or moving the piston and plunger 174 to the left, Fig. 19, thus permitting poppet valve 117 to again close and shut off the live air from line 118.

Since the floor pan is of uneven contour, for example, a tunnel is provided along the longitudinal center line of the floor pan to take care of the propeller shaft, and since reinforcements 7, 8 and 9, for example, are positioned in part on opposite sides of this tunnel, it is necessary that the welding tools be swung upwardly to clear this tunnel. To this end the pin 300 on the jig depresses lever 132 which controls a slide valve 133. When the lever 132 is depressed by the pin 300, live air line 100 is placed in communication with line 134 which brings live air into the cylinder 88, raising piston 87 which, acting through crank 84, rotates the tubular support 80 for the welding heads and swings them upwardly to the dotted line position shown in Fig. 12 so that they will clear the tunnel in the floor pan or any other portion which has a higher elevation than the portion being welded by the respective tools.

As soon as pin 300 rides off lever 132, a spring 135 reverses the valve 133, opens line 134 to exhaust and connects line 136 with the main air line 100. This brings live air into the cylinder above the piston 87 which lowers the same and through crank 84 swings the welding head downwardly into operative position indicated in the full lines of Fig. 12.

Figure 1A:
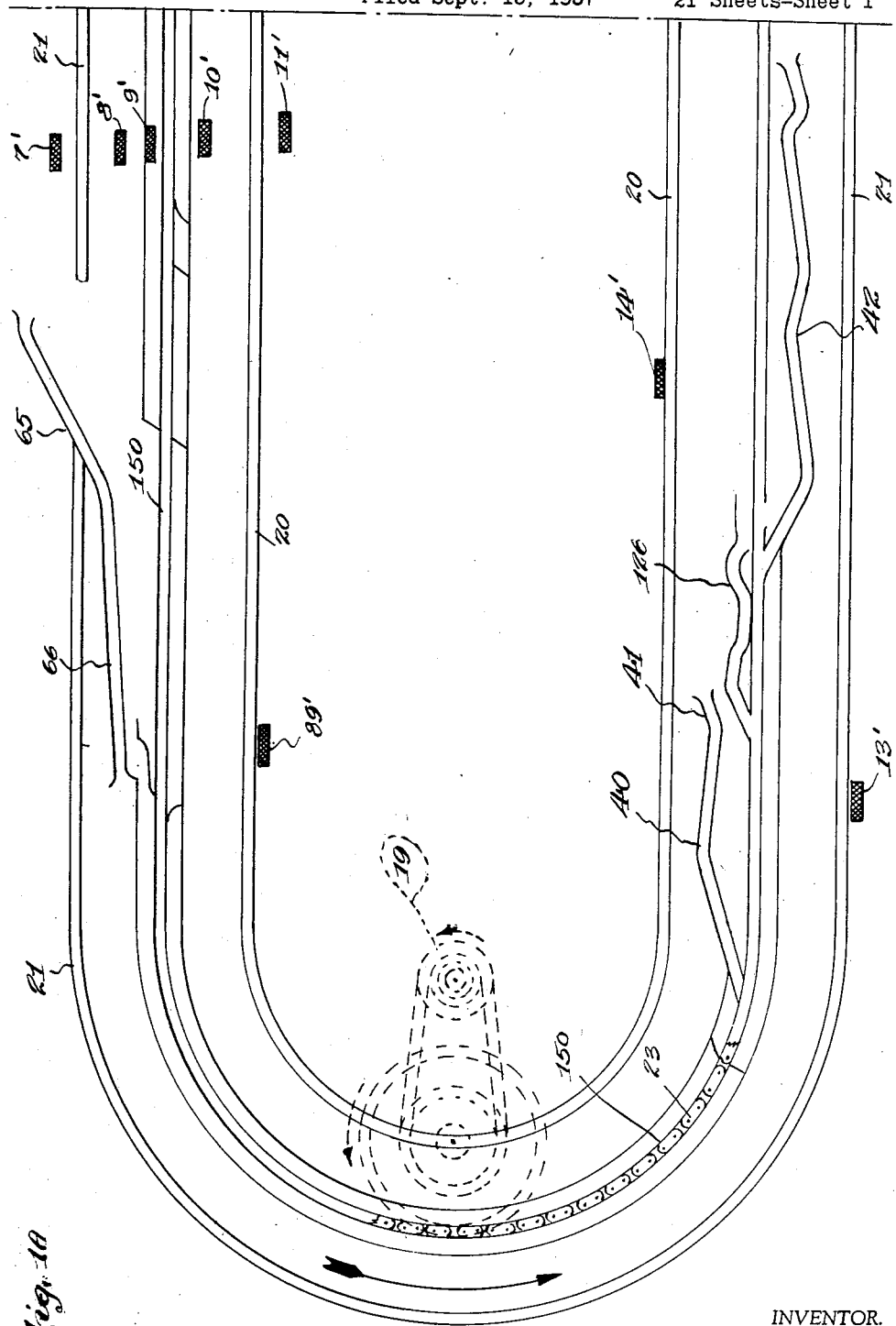
Fig. 1C is a section through the track showing the anti-friction roller.

The jig with the work in place, as above described, travels in the direction of the arrow, Fig. 1A. The connection 24 always travels with the conveyor chain intermediate the tracks 20 and 21 in slot 150.

The work now continues about the curved right-hand end of the trackway to the position shown in Fig. 5. At this time the pin 27 engages cam groove 46 which is in alignment with the straightaway portion of slot 150, Fig. 5. Pin 27 cooperates with groove 46 and at this time reinforcement members 2 and 1 are presented to welding tools 2' and 1'. Welding electrode 30 is projected into contact with the floor pan when pin 300 depresses lever 111 as above described and travels with the work in a rectilinear line until retracted. The electrode is automatically retracted as above described. As soon as the electrode 30 leaves the work, spring 33 returns it to initial position after each weld. The welding circuit is closed and current flows through the electrodes and the work shortly after the electrode contacts the work and the welding circuit is broken after the electrode passes through center position but before it reaches retracting position. This cycle is repeated to spot weld piece 1 and 2 to the floor pan and until pin 300 rides off lever 111.

As the jig travels on, pin 27 rides free of cam groove 46 and pin 26 strikes the cam face 47 which shifts the jig to the position shown in Fig. 6, pin 27 having moved outwardly through the opening 48. This presents the parts 3 and 4 to welding tools 3' and 4' which simultaneously make parallel lines of spot welds between the parts 3 and 4 respectively and the floor pan A to secure the same together, as shown in Fig. 2.

As the work travels on in the position shown in Fig. 6, the pin 26 rides free of straight line cam groove 150. Pin 25 engages cam 50 thus shifting the rear end of the jig to the right as viewed in the direction of travel until pin 25 rides into a straight cam groove 150. At this time the reinforcements 5 and 6 are presented to welding stations 5' and 6' which again make a plurality of straight line spot welds between the members 5 and 6 and floor pan A to secure the same together, Figs. 7 and 2.

As soon as parts 5 and 6 are welded to the floor pan A, pin 60 rides into cam groove 61 (Fig. 8) and pin 25 shifts to the right out of groove 150 through outlet 62. Cam groove 61 runs obliquely toward the straight portion of groove 150 where it joins it at 63. Since pin 24 continues along the straightaway groove 150, pin 60 cooperates with groove 61 to swing the jig counter-clockwise, as viewed in Fig. 8, until pin 60 rides into groove 150, Fig. 9. This swings the jig counter-clockwise to a position 90° from that shown in Fig. 6, thus positioning parts 11, 10, 9, 8, 7 in a line parallel with the groove 150. This presents these parts to welding stations 11', 10', 9', 8' and 7' which simultaneously make parallel lines of spot welds for securing these several members to the floor pan, as shown in Figs. 9 and 2.

As the jig moves on, pin 27 rides into cam groove 65, Fig. 10, and pin 60 rides out of cam groove 150 through outlet 66. Since cam groove 65 runs obliquely toward cam groove 150, pin 27 cooperates with cam groove 65 to swing the jig approximately 85° clockwise from the position shown in Fig. 9 until pin 27 rides into cam groove 66 which is a continuation of cam groove 65. Cam groove 66, as shown, runs toward cam groove 150 at an angle of a few degrees. As pin 27 enters groove 66, the side flanges 89 of members 7, 8, 9, 10 and 11 are presented to welding horizontal tool 89'. Pin 27 cooperates with cam groove 66 to shift the work continuously as it passes through welding station 89' so that flanges 89 are welded to the pan A along parallel lines of welding which are also parallel to the curved left-hand side edge of the floor pan. After leaving station 89' the rocker panels 13 and 14 are placed on the floor pan A (Fig. 2) and may be clamped into position manually by means of mechanism (not shown) carried by the jig 22. Upon rounding the corner, pin 25 and roller rides into cam groove 40 (Fig. 3, Fig. 1A) and rocker panel 13 along the outside curved edge of the floor pan A is presented to welding tool 13' of the above described type. As the jig and the floor pan move along through welding station 13', the camway 40 coacting with pin 25 shifts the jig and the work relative to the upper welding electrode 30 of tool 13' so that the spot on the work engaged by the upper electrode travels in approximately or practically a straight line while the electrode contacts the work during each weld.

As the work and jig travel on past welding tool 13', pin 25 is shifted to the left by the portion 41 of cam groove 40. This swings the rear end of the jig leftward, viewed in the direction of travel or upwardly as viewed in the drawings, Fig. 1A, thus causing the portion of the jig forward of the pivot 24 to swing to the right and at the same time the portion of jig 22 to the rear of connection 24 swings to the left which offsets the extreme rear end of the work which has an upward sweep as at 125 from tool 13'. This permits the elevated rear of the work to clear tool 13' and obviates the need for swinging tool 13' to raised position shown in dotted lines, Fig. 12. As the jig travels on the pin 25 rides out of groove 40 and pin 26 rides into and along cam groove 126 until pin 27 rides into and along cam groove 42 (Fig. 4), which continuously shifts the work as it passes through welding tool 14' so that a row of spot welds is made securing part 14 to the floor pan. This line of spot welds is substantially parallel to and follows the curved outer edge of the pan A.

As the jig travels on, as above described, the portion of jig 22 to the rear of pivot 24 rides down inclines 95 and the jig is lowered on to tracks 20' and 21'. At this time pin 26 rides into, along and through cam groove 97 whereupon pin 25 rides into cam groove 43 thus continuously horizontally shifting the jig 22 and the work as the curved lower side edge 91 of rocker panel flange 15 is welded as above described by horizontally positioned tool 15'.

As pin 25 rides out of cam groove 43, pin 27 rides into cam groove 98 and vertical flange 16 of the other rocker panel 14 is welded by tool 16'. Cam groove 98 cooperates with the pin 27 to continuously shift the jig and work in a horizontal plane as it travels through welding tool 16' so that while the horizontal electrode 30 is in contact with the work, the spot on the work contacted by the electrode travels in substantially a straight line.

The jig travels on and since the parts are now all welded to the floor pan, the jig is unloaded and again presented to the loading station.

In Figs. 25, 26, 27, 25A, 26A and 27A, there is shown a modified form of the jig and track arrangement where the line of weld undulates in a horizontal plane as well as in a vertical plane. The jig 180 carries the work to be welded in the same manner as the jig 22 carries the floor pan above described. The jig 180 also comprises the lower electrode. The jig is mounted upon two pairs of individual casters 181, 182 which are free to swivel in the usual fashion. The forward casters 182 ride along the narrow gauge trackways 183 and the rear casters 181 ride along the wide gauge trackways 184. The jig 180 is propelled by an endless chain 185 which is connected to the jig 180 by a pin and universal joint arrangement 186. The welding tool used with this type of jig (the electrode being shown at 30) is the pivoted reciprocating type identical with that described above and shown, for example, in Fig. 12. The line of weld is indicated by the crosses 187 in the plan views, Figs. 25, 26 and 27, and by the dotted line 187 in the side elevation, Figs. 25A, 26A and 27A. The trackways 183 and 184 undulate both in a horizontal plane, Fig. 25, as well as in a vertical plane, Fig. 25A, and cooperate with the casters 181 and 182 to shift the jig horizontally and vertically so that the tip of the welding electrode 30, while in contact with the work during the welding cycle, always travels in the same horizontal plane and reciprocates in approximately the same vertical plane regardless of the vertical and horizontal undulating of the line of weld. This is shown progressively in these Figs. 25, 26, 27, 25A, 26A and 27A.

In some instances it may be desirable to shift the welding tool vertically or horizontally. Such an arrangement is shown in Figs. 28-31. Here again the jig 188 is propelled along horizontal tracks 189 by an endless conveyor chain 23. The upper electrode 30 is reciprocated by the usual piston within the air cylinder 31. The air cylinder 31 is pivotally supported by pin 32 upon a support 78 in the same manner as in the principal form of the invention described above. Thus, as the work travels towards the observer, as viewed in Fig. 28, the electrode 30 is projected into contact with the work, is carried along by the work toward the observer until it is retracted whereupon the spring 33 again returns cylinder 31 and electrode 30 to starting position.

In cases where the work to be welded 190 undulates so that the line of weld undulates in a vertical as well as a horizontal plane, arrangement is made for shifting the welding tool 30, 31 instead of the work. To this end the support 78 for the tool is pivoted on pin 191 carried by support 193 to swing with the cylinder 31 and electrodes 30 transversely of the work, for example, into the dotted line position, Fig. 28 as occurs when the welding tool is shifted laterally while the electrode 30 is in contact with the work. The support 78 and welding tool is yieldably held in vertical center position by the equal and opposed springs 192 which return the tool to center after each weld when the tool is shifted relative to the work during welding. The support 193 is slidably supported by the angle iron frame 194 which is supported by the posts 195. A rod 196 is secured by bolts 197 to the support 193. The rod 196 has a pin and elongated slot connection 198 at each end with levers 199 pivoted as at 200 to a fixed support. The lower end of each lever has a pin and elongated slot connection 201 with a horizontally sliding rod 202 provided with a roller 203 which engages a cam 204. The cams 204 undulate in a horizontal plane corresponding to the horizontal undulating of the weld line and act through the rods 202, levers 199 and rods 196 to shift the welding tool and electrode 30 transversely to either side of the center (full line position Fig. 28) as the work 190 travels beneath the tool. This permits the tool to weld along a line undulating in a horizontal plane without horizontal shifting of the jig 188. It is, of course, appreciated that when the tool is shifted to the right, as indicated by the dotted line positions of the tool and also the lever 199 in Fig. 28, that the left hand roller 203 will be at a high point of the cam 204 and the roller 203 on the right hand side will be at a correspondingly low point of the right hand cam 204.

Where the work undulates upwardly and downwardly in a vertical plane the frame 194 is raised and lowered to correspond to the vertical undulation of the work by means of undulating trackways 205, Fig. 31, which cooperate with rollers 206 carried by pins 207 rigidly connected to the foot of the posts 195. The posts 195 are supported vertically by the shoes 208 which are slidable in the channel guideways 209.

In those instances where the work 190 is inclined from the horizontal, as shown in Fig. 29, it is desirable to have the electrode and tool 30, 31 operate perpendicular to the surface of the work. As shown in Fig. 29, in such cases the left hand trackway 205 will raise the left hand side of the frame 194 and the right hand trackway 205 will lower the right hand side of the frame 194 sufficiently to maintain the welding tool and electrode so that they will swing forward with the work and return in a plane normal to the surface of the work 190. It will be noted that the outer edge of the shoes 208 is rounded as at 210 to permit this turning of the frame 194 in a vertical plane.

The lower edge 211 of a rocker panel, for example, may undulate as shown in Fig. 39. In welding this undulating edge of the rocker panel to the vertical flange 213 of the floor pan it may be desirable to raise and lower the welding tool rather than the jig. Such an arrangement is shown in Figs. 37, 38 and 39. As herein shown the welding electrode 91 and cylinder 15' is pivoted on a vertical pin 32' carried by arm 214 in a manner identical with the tool shown in Fig. 13, for example. Thus the welding tool is free to reciprocate with the work in a horizontal plane. The other end of the arm 214 is pivotally mounted on the horizontal pin 215 carried by the fixed support 216 for pivoting upwardly and downwardly. The arm 214 is guided in its vertical travel by the guides 217. A roller 218 is mounted on the horizontal pin 219 carried by the arm 214. This roller rides along the undulating cam surface 220 of the cam 222 which is fixed on the jig 223. The jig is otherwise identical with those above described and propelled in the same manner. The guides 217 are provided with a stop 224 for supporting the arm 214 whenever the roller 218 is not riding along a cam 222. The cam surface 220 corresponds to the undulation of the line of weld 221 in a vertical plane and correspondingly raises and lowers the welding tool to weld along this line. Thus, as described above, the point of contact of the welding electrode 91 with the rocker panel during the welding cycle travels with the work and no slippage occurs between the electrode 91 and the rocker panel.

In Figs. 36 and 40 the general mounting of the valve control levers 111 and 132 and 239 is shown. As shown, the levers 111, 132 and 239 are mounted on a common vertical pivot pin 225 to a stationary part of the welding station and each is provided with any number of cams 226 desired. As shown, the lever 111 is provided with two cams 226, 227. Thus, as the pin 300 travels along the lever 111 it will engage the first cam 227 and start a welding tool in operation. As long as the pin rides along the cam 227, the valve 109 will be open and this welding tool will operate. The operation of this specific welding tool will cease when the pin rides off the cam 227. As the pin travels from cam 227 to cam 226 the tool is inoperative and may be swung upwardly (as shown in Fig. 12) to clear a raised portion of the work by means of pin 300 depressing lever 132. Upon reaching cam 226 the pin again depresses lever 111 and the welding tool is again set in operation. The number of cams on any lever 111, 132 and the spacing of these cams will be entirely governed by the character of the line of weld on any given piece of work, i. e., whether this line is continuous or discontinuous. A compression spring 228 acts against the end of each lever 111 so that the poppet valves are normally closed except when the lever is depressed by the pin 300 riding over the cam 226. The pins which act against the cams to depress levers such as 111 and 132 can be mounted on any moving part of the machine such as the jig, or conveyor chain and preferably should be positioned immediately below the pivotal connection 24 between the jig 22 and conveyor chain 23.

It is, of course, understood that the arrangements above described for shifting the jig relative to the welding tools can also be combined with the arrangements above described for shifting the welding tools in relation to the jigs. In such case to weld an undulating line either the jig or the tool alone or both jig and tool could be shifted depending upon choice or desirability in view of the conditions obtaining in any given welding job.

In Figs. 32–35 there is shown a plurality of pneumatically operated clamping rollers for clamping the rocker panels 13 and 14 and floor pan together and against the jig during the welding operation. The roller 230 is carried by the arm 231 pivoted upon a stationary part of the machine. The arm 231 is pivotally connected with a plunger 232 and piston 234 in air cylinder 233. During the welding operation the piston 234 presses the roller 230 down upon the rocker panel and floor pan to hold them tightly together and against the jig. The clamping and unclamping of the arm 231 and roller 230 is controlled by the piston 234 in cylinder 233. Two air lines 235 and 236 are alternately connected to a branch 237 of the main air line through a poppet valve arrangement 238. The poppet valve arrangement 238 is controlled by a cam lever 239 (Fig. 40) and pin 300 carried by the jig, as shown in Fig. 36. Normally the piston 234, connecting rod 230, and lever 231 are in retracted position. When pin 300 depresses the cam lever 239 air is admitted above the piston 231 which projects the roller 230 into clamping engagement with the rocker panel and floor pan preferably prior, during and until the welding operation is completed. The vertical lower side of the rocker panel is also held against the floor pan and vertical face of the jig by a pair of rollers 240 carried by a swivel arm 241 pivoted as at 242 on the bell crank arm 243. The bell crank arm 243 is pivoted as at 244 to a stationary part of the machine and operated by an air cylinder and piston arrangement 245 with a cam control identical with the control for roller 230 described above. Since it is essential to obtain a good weld, that the floor pan and reinforcements not only be clamped tightly together but also to the jig electrode during welding, it will be seen that the above described clamp will serve this purpose and particularly in those cases where differences in the shapes of the floor pans and reinforcements caused by variations of metal forming properties may result in the floor pan and reinforcements not properly contacting each other and the jig electrode in the absence of clamping pressure. In other modifications of the invention, both manual or power clamping means, or both types, which are commonly used in connection with various designs of jigs and fixtures, could be employed as required by a particular job.

Preferably to reduce the load on the driving motor the tracks are provided with anti-friction means upon which the work jigs roll. Fig. 1C is a sectional view showing a preferred anti-friction means in the form of a roller 250 mounted on roller bearings and supported by the pin 251 upon the rail 20. These anti-friction rollers are preferably provided along the entire length of the tracks. Since the work jigs shift back and forth across the tracks during certain portions of their continuous movement along the tracks, the anti-friction rollers in these shifting areas are positioned at an angle to their supporting track so that they always roll generally in the direction of travel of that portion of the jig with which they contact. This prevents sidewise slippage between the rollers and the jig as the jig shifts.

I claim:

1. Welding apparatus comprising a carrier for the work to be welded, a plurality of welding stations for electrically welding said work, each of said welding stations including a plurality of opposed electrodes arranged to contact and travel with the work during welding, conveyor mechanism for continuously propelling said carrier by said welding stations, and mechanism for automatically shifting said work carrier between welding operations to present different areas of said work to different welding stations.

2. Welding apparatus for welding work along a plurality of lines some of which run obliquely to others, a carrier for the work to be welded, a plurality of welding stations for electrically welding the said work along the said lines, conveyor mechanism for propelling the said carrier by said welding stations consecutively, and mechanism for automatically shifting said work carrier after it leaves one welding station preparatory to entering another welding station to thereby present different areas of the said work to different welding stations for welding along the aforesaid lines.

3. Welding apparatus for welding work in different areas some of which are positioned in different planes than others, comprising a carrier for the work to be welded, a plurality of welding stations for electrically welding said work, each of said welding stations including a plurality of opposed electrodes arranged to contact and travel with the work during welding, conveyor mechanism for continuously propelling said carrier by said welding stations, and mechanism operable after the work carrier leaves one welding station for automatically relatively elevating the said work carrier and the said welding station to present to the next welding station an area of the said work in a different plane than the area presented to the preceding welding station.

4. Welding apparatus comprising a carrier for the work to be welded, a plurality of electrical welding stations for performing independent welding operations on the said work, each of said welding stations including a plurality of opposed electrodes arranged to contact and travel with the work during welding, conveyor mechanism for continuously propelling the said carrier unidirectionally by the said welding stations, and mechanism for automatically shifting the said work carrier laterally of sad direction of travel to present different areas of said work to different welding stations.

5. Welding apparatus for welding work in a plurality of lines some of which are oblique to others, comprising a carrier for the work to be welded, a plurality of electrical welding stations including welding electrodes arranged to contact and travel rectilinearly with the work during the welding operation, conveyor mechanism for propelling said carrier by said welding stations, mechanism for guiding said work carrier through said welding stations in a straight line direction and for automatically shifting said work carrier between welding stations to present different areas of said work to different welding stations.

6. In a welding apparatus for welding work along a curved line, a carrier for the work to be welded, and electrical welding stations including a plurality of electrodes arranged to travel in a rectilinear path during the welding operation, conveyor mechanism for propelling said carrier through said welding station, and mechanism for automatically and continuously shifting said work carrier during the welding operation while the work is clamped between the electrodes whereby the area being welded travels in substantially a straight line during the welding operation.

7. Welding apparatus comprising a plurality of carriers for work to be welded, mechanism for driving said work carriers bodily along a predetermined course to present separate carriers and work consecutively to said below-mentioned welding stations, a plurality of welding stations positioned along said course each comprising one or more welding tools for electrically welding different areas of work and arranged to travel with the work during welding, and means for shifting one or more of said work carriers and work to present different areas of said work to different welding stations.

8. Welding apparatus comprising a plurality of carriers of work to be welded, mechanism for continuously driving said work carriers bodily along a predetermined course to present separate carriers and work consecutively to said below-mentioned welding stations, a plurality of weldinig stations positioned along said course each comprising one or more welding tools for electrically welding different areas of said work, and means for shifting one or more of said work carriers and work relative to said welding stations while in motion along said predetermined course to present different areas of said work to different welding stations.

9. Welding apparatus comprising a plurality of carriers for work to be welded, mechanism for continuously driving said separate work carriers bodily along a predetermined course to present separate carriers and work consecutively to said below-mentioned welding stations, a plurality of welding stations positioned along said course each comprising one or more welding tools for electrically welding different areas of said work, and means associated with one or more of said carriers actuated by the forward motion of one or more of said work carriers while the work carrier is continuously moving along said predetermined course to shift one or more of said work carriers and work to present different areas of said work to different welding stations.

10. Welding apparatus comprising a work carrier for carrying work to be welded, mechanism for driving said work carrier bodily along a predetermined course to present said carrier to a welding station, a welding station compising one or more tools for electrically spot welding said work, each tool having an electrode for intermittently contacting the work and traveling with the work in an approximately rectilinear path while in contact with the work, and means for shifting said work carrier and work while in said welding station to move the area in contact with the said welding electrode along an approximately straight line parallel to the line of travel of said electrodes whereby the said approximately rectilinearly traveling electrodes can weld the work along a curvilinear, broken or irregular line.

11. Welding apparatus comprising a plurality of carriers for work to be welded, a stationary support for said carriers including a trackway along which said carriers travel, mechanism for continuously driving said work carriers' bodily along said trackway to present separate carriers and work consecutively to said below-mentioned welding stations, a plurality of welding stations positioned along said trackway for electrically welding different areas of work, and means comprising cooperating members carried by said carriers and fixed support for shifting one or more of said work carriers and work to present different areas of said work to different welding stations.

12. Electrical welding apparatus comprising a plurality of carriers for work to be welded, a stationary support for said carriers including a trackway along which said carriers travel, conveyor mechanism for driving said work carriers bodily along said trackway to present separate carriers and work consecutively to said below-mentioned welding stations, a pivotal connection between one or more of said carriers and said conveyor, mechanism for swiveling said carriers on said trackway about said pivotal connection with said conveyor, a plurality of welding stations each comprising one or more welding tools for electrically welding different areas of work, and means for shifting one or more of said work carriers about its pivotal connection with the conveyor mechanism to present different areas of said work to different welding stations.

13. Electrical welding apparatus comprising a plurality of carriers for work to be welded, a stationary support for said carriers including a trackway along which said carriers travel, conveyor mechanism for driving said work carriers bodily along said trackway to present separate carriers and work consecutively to said below-mentioned welding stations, a universal pivotal connection between one or more of said work carriers and conveyor, mechanism for swiveling said carrier about said pivot across said trackway and up and down relative to said trackway, a pivotal connection between one or more of said carriers and said conveyor, mechanism permitting said carriers to swivel on said trackway, a plurality of welding stations each comprising one or more welding tools for electrically welding different areas of work, and means for shifting one or more of said carriers about said universal pivotal connection with the conveyor mechanism for presenting different areas in the same and different planes of said work to different welding stations.

14. Electrical welding apparatus comprising a plurality of carriers for work to be welded, a stationary support for said carriers including a trackway along which said carriers travel, conveyor mechanism for driving said work carriers bodily along said trackway to present separate carriers and work consecutively to said below-mentioned welding stations, a pivotal connection between one or more of said carriers and said conveyor, mechanism for swiveling said carriers on said trackway, a plurality of welding stations each comprising one or more welding tools for electrically welding different areas of work, and means for shifting one or more work carriers and work to present different areas of work to different welding stations, said means comprising a cooperating cam groove and a member for driving along said groove one of which is carried by a carrier and the other of which is mounted on the fixed support.

15. Welding apparatus comprising a plurality of carriers for work to be welded, a stationary support including an endless trackway along which said carriers travel, a continuously moving endless conveyor chain for continuously driving the separate work carriers bodily along said endless trackway to present separate carriers and work consecutively to said below-mentioned welding stations, a plurality of welding stations positioned along said trackway, each comprising one or more welding tools for electrically welding different areas of said work, a pivotal connection between one or more of said carriers and the conveyor chain, means for swiveling the carrier about said pivot and across said trackway, and means comprising cooperating members carried by said carriers and stationary support for shifting one or more of said work carriers and work while in motion along said trackway to present different areas of said work to different welding stations.

16. Welding apparatus comprising a plurality of carriers for work to be welded, a stationary support including an endless trackway along which said carriers travel, the upper surface of the said trackway along which the carriers travel being in a substantially single plane, a continuously moving endless conveyor chain for continuously driving the separate work carriers bodily along said endless trackway to present separate carriers and work consecutively to said below-mentioned welding stations, a plurality of welding stations positioned along said trackway, each comprising one or more welding tools for electrically welding different areas of said work, a universal pivotal connection between the conveyor chain and carrier whereby the carrier can swivel about said pivot and across said trackway, and means comprising cooperating members carried by said carrier and stationary support for shifting one or more of said work carriers and work while in motion across said trackway to present different areas of work to different welding stations, and means for pivoting one or more of said carriers about the said pivotal connection with the chain to change its elevation relative to the said trackway to present other different areas of said work in a different plane to different welding stations.

17. In a welding apparatus comprising a work carrier for work to be welded, said work having an unlevel contour, a stationary support including a substantially level trackway along which said carrier travels, mechanism for driving said work carrier along said trackway, a welding station comprising one or more welding tools for electrically welding the said work, and means including cooperating members carried by said carrier and stationary support for shifting said carrier laterally of the said trackway whereby the portions of the work and jig having a higher elevation than the lowermost member of the welding tool are shifted clear of this portion of the tool.

18. Electrical welding apparatus comprising a carrier for work to be welded, said work having an unlevel contour, a stationary support for said work carrier including a substantially level trackway along which said carrier travels, mechanism for driving said work carrier along said trackway to present the work to a welding station, a welding station positioned along the trackway comprising one or more welding tools for electrically welding the said work, one or more of said welding tools having an electrode the lowermost point of which is positioned below the uppermost point of said work while traveling through the welding station, a pivotal support for said welding tools about which said welding tools can be swung upwardly to clear the higher points of the work, and means including a control member carried by the work carrier for swinging the said welding tools about said pivotal support to clear the work.

19. Electrical welding apparatus comprising a carrier for work to be welded, said work having an unlevel contour, a stationary support for said work carrier including a substantially level trackway along which said carrier travels, mechanism for driving said work carrier along said trackway to present the work to a welding station, a welding station positioned along the trackway comprising one or more welding tools for electrically welding the said work, one or more of said welding tools having an electrode the lowermost point of which is positioned below the uppermost point of said work while traveling through the welding station, a support for said welding tools about which said welding tools can be moved upwardly to clear the higher points of the work, and means including a control member carried by the work carrier for moving the said welding tools about said pivotal support to clear the work.

20. Electrical welding apparatus comprising a carrier for work to be welded, said work having an unlevel contour, a stationary support for said work carrier including a substantially level trackway along which said carrier travels, mechanism for driving said work carrier along said trackway to present the work to a welding station, a welding station positioned along the trackway comprising one or more welding tools for electrically welding the said work, one or more of said welding tools having an electrode the lowermost point of which is positioned below the uppermost point of said work while traveling through the welding station, a support for said welding tools about which said welding tools can be moved upwardly to clear the higher points of the work, and means operated by fluid under pressure including cooperating control members carried by the work carrier and a stationary part of the apparatus for moving the said welding tools about said pivotal support to clear the work.

21. In a mass production welder, the combination of a spot welder provided with a control and arrangement to continuously repeat when the control is thrown to provide a line of spot welds and a work conveyor for propelling the work past the repeat welder, the said conveyor provided with means for causing the control for the repeat welder to be thrown on and off to determine the length of the line of welding.

22. In a mass production welder, the combination of a repeat welder provided with a pair of welding electrodes arranged to be separated and brought together by relative reciprocation and having a control which, in the on position, allows the spot welder to continuously repeat by bringing the electrodes rapidly together, by throwing on and off the current and by separating the electrodes, and a work conveyor including a jig which is one of the said electrodes, said conveyor provided with a cam for tripping the control that turns the repeat welder on and off.

23. In a mass production welder, the combination of a repeat spot welder having a control and automatically reciprocated electrodes reciprocating continuously during the period of the repeat operations and a traveling electrode in the form of a work jig, current supply means with which the jig contacts in its travel, means on which said traveling electrode is carried and means carried by the last mentioned means for tripping the control member to start one or more of the repeat welders and to determine the length of the line of spot welds.

24. In a mass production welder, a plurality of repeat spot welders grouped in gangs at a plurality of stations, a control for each gang or station for determining when the repetitions of the welder begin and end and a carrier for the work carrying the work continuously through the stations and provided with means for tripping said control members to determine the position and length of the line of welds on the work.

25. In a mass production welder, the combination of a spot welding tool provided with electrodes having relative reciprocation and continuous repetition, a control for one or more of the welders for determining the period of continuous repetition and means for carrying the work continuously past one or more of the welding tools and for operating the said control, said welding electrodes arranged for travel with the work when the electrodes are in contact with the work.

26. In a mass production welder, the combination of a spot welding tool provided with electrodes having relative reciprocation and periodically continuous repetition, a control for the welder for determining the period of continuous repetition and means for carrying the work continuously past the welding tool and for operating the said control, said welding electrodes arranged for travel with the work when the electrodes are in contact with the work, one of the electrodes having a forward and backward movement in traveling with the work and returning and the other electrode being in the form of a continuously traveling table supporting the work on the said carrier and electric current supply means which the electrode table contacts during the welding operation.

27. In a mass production welder, the combination of a plurality of welding stations, each station equipped with one or more repeat welders, a control member for controlling the repeat operations at each station, and a conveyor for carrying the work through the stations provided with means for operating the control members to govern the period of operation of the repeat spot welders and the length and position for the line of welds.

28. In a mass production welder, the combination of a plurality of welding stations, each station equipped with one or more repeat welders, a control member for controlling the repeat operations of one or more welders at each station and a carrier for carrying the work through the stations provided with means for operating the control members to govern the periods of operation of the repeat spot welders and the length and position of the lines of welds, said repeat welders each having a fluid pressure reciprocated electrode and a fluid pressure controlled repeat mechanism.

29. In a mass production welder, a plurality of spot welders arranged in gangs at several stations and provided with mechanism for making each welder continuously repeat during controllable periods and means for passing work through the station and the welders and for operating the said control mechanism to determine the repeat periods.

30. In a mass production welder, the combination of a plurality of welding stations arranged in the line of travel of the work, each station provided with one or more spot welders with mechanism for causing the spot welder or welders to continuously repeat during controlled periods and means for conveying the work through the stations and spot welders and operating the repeat control mechanism to determine the weld lines made by the repeating spot welders.

31. In a mass production welder, the combination of a conveyor, a plurality of welding stations, each welding station having one or more repeat spot welders with mechanism for causing continuous repetition of the welders during controlled periods, a jig in the form of an electrode table carried by said conveyor and arranged to hold a plurality of pieces of work in temporarily assembled position, the said jig being conveyed through the stations by the conveyor and means carried by the jig for causing the said controlled repeat mechanism to start the spot welders and stop them at given predetermined periods of travel of the jig.

32. In an electrical welding apparatus a welding station having a welding tool, a work conveyor for propelling the work past said tool, a shiftable support for said tool, and means for shifting said support and welding tool relative to said conveyor and work and across the path of travel of said conveyor and work to welding along an undulating or irregular line.

33. In an electrical welding apparatus a welding station having a welding tool, a work conveyor for propelling the work past said tool, a shiftable support for said tool, and cooperating means carried by said conveyor and welding station coacting as the work and conveyor passes through said station to shift said support and tool relative to said conveyor and work and across the path of travel of said conveyor and work to weld along an undulating or irregular line.

34. In an electrical welding apparatus, a stationary welding station having a welding tool, a continuously moving work conveyor traveling in a single plane for propelling the work past the said tool, a shiftable support for said tool, and cooperating means carried by said conveyor and welding station coacting as the work and conveyor pass through the said station to shift said support and tool up and down and laterally of said work and conveyor to weld in different horizontal and vertical planes.

35. In an electrical welding apparatus a welding station having an automatic repeat spot welding tool, a work conveyor for propelling the work past said tool, a shiftable support for said tool, cooperating means carried by said conveyor and welding station coacting as the work and conveyor passes through said station to shift said support and tool relative to said conveyor and work and across the path of travel of said conveyor and work to weld along an undulating or irregular line, and control means carried by said work conveyor and station for starting and stopping the repeat spot welding tool as the work passes through said station.

36. In an electrical welding apparatus, a stationary welding station having an automatic repeat spot welding tool, a continuously moving work conveyor traveling in a single plane for propelling the work past the said tool, a shiftable support for said tool, cooperating means carried by said conveyor and welding station coacting as the work and conveyor pass through the said station to shift said support and tool up and down and laterally of said work and conveyor to weld in different horizontal and vertical planes, and control means carried by said work conveyor and station for starting and stopping the repeat spot welding tool as the work passes through said station.

37. In a mass production welder, the combination of a welder provided with a control and arranged to weld along a line when the control is thrown, and a work conveyor for propelling the work past the welder, the said conveyor provided with means for causing the control for the welder to be thrown on and off to determine the length of the welding line.

38. In a mass production welder, the combination of a welder provided with a pair of welding electrodes arranged to be separated and brought together by relative reciprocation and having a control which, in the on position, allows the welder to weld by bringing the electrodes rapidly together, by throwing on and off the current and by separating the electrodes, and a work conveyor including a jig which is one of the said electrodes, said conveyor provided with a cam for tripping the control that turns the welding on and off.

39. In a mass production welder, the combination of a spot welder having a control and an electrode projectable into contact with the work for welding and retractable from the work after welding and a traveling electrode in the form of a work jig, current supply means with which the jig contacts in its travel, means on which said traveling electrode is carried and means carried by the last mentioned means for tripping the control member to project the electrode into contact with the work for welding and subsequently to retract the electrode to determine the length of the line of welding.

40. In an electrical welding apparatus, a welding station having a welding tool, a work conveyor including a shiftable work jig for propelling the work past said tool, a shiftable support for said tool, and means for shifting said support and welding tool relative to said conveyor and work and across the path of travel of said conveyor and work, and means for shifting the work jig relative to said welding tool whereby the jig and tool cooperate to weld along an undulating or irregular line.

41. In a mass production welder, the combination of a spot welder provided with a control and arrangement to continuously repeat when the control is thrown to provide a line of spot welds, a work support, a conveyor for relatively moving the work support and the repeat welder, and means operated by the said relative movement between the repeat welder and work support for causing the control for the repeat welder to be thrown on and off to determine the length of the line of welding.

42. In a mass production welder, the combination of a spot welding tool provided with electrodes having relative reciprocation and continuous repetition, a work support, a conveyor for relatively continuously moving the work support and the spot welding tool, a control for the welding tool for determining the period of continuous repetition, and means operated by the said conveyor for causing the control for the spot welder to be thrown on and off to determine the length of the line of welding.

43. In a mass production welder, the combination of a welder provided with a control, a work support, a conveyor for relatively continuously moving the work support and the welder, the said conveyor provided with means for causing the control for the welder to be thrown on and off as the work moves relative to the welder to determine the length of the welding.

EDWARD G. BIEDERMAN.